(12) United States Patent  
Miyamoto et al.

(10) Patent No.: US 8,471,987 B2
(45) Date of Patent: Jun. 25, 2013

(54) LIQUID CRYSTAL DISPLAY DEVICE

(75) Inventors: Kenichi Miyamoto, Kumamoto (JP); Masami Hayashi, Tokyo (JP); Manabu Tanahara, Kumamoto (JP); Masaru Aoki, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/450,849

(22) Filed: Apr. 19, 2012

(65) Prior Publication Data

US 2012/0200799 A1    Aug. 9, 2012

Related U.S. Application Data

(62) Division of application No. 12/432,320, filed on Apr. 29, 2009, now Pat. No. 8,208,103.

(30) Foreign Application Priority Data

Apr. 30, 2008 (JP) .................................. 2008-118345

(51) Int. Cl.
*G02F 1/1335* (2006.01)
*G02F 1/1333* (2006.01)
*G02F 1/1339* (2006.01)

(52) U.S. Cl.
USPC ........... 349/114; 349/138; 349/153; 349/155; 349/157

(58) Field of Classification Search
USPC .................. 349/114, 155–157, 138
See application file for complete search history.

(56) References Cited

U.S. PATENT DOCUMENTS

| 6,304,308 | B1 * | 10/2001 | Saito et al. ................ 349/155 |
| 7,569,854 | B2 * | 8/2009 | Yamazaki et al. .......... 257/59 |
| 7,719,655 | B2 * | 5/2010 | Yang et al. ................ 349/155 |
| 2002/0176040 | A1 * | 11/2002 | Lim et al. ................ 349/113 |
| 2003/0071959 | A1 | 4/2003 | Koyama |
| 2005/0200799 | A1 * | 9/2005 | Murai ....................... 349/156 |

(Continued)

FOREIGN PATENT DOCUMENTS

| JP | 10-10516 A | 1/1998 |
| JP | 10-325959 A | 12/1998 |

(Continued)

OTHER PUBLICATIONS

Japanese Office Action issued Jul. 17, 2012 in patent application No. 2008-118345 with partial English translation.

*Primary Examiner* — Bumsuk Won
*Assistant Examiner* — Charles Chang
(74) *Attorney, Agent, or Firm* — Oblon, Spivak, McClelland, Maier & Neustadt, L.L.P.

(57) ABSTRACT

A liquid crystal display device has pixel electrodes including a transmissive pixel electrode and a reflective pixel electrode. The liquid crystal display device includes a TFT array substrate, an opposing substrate, a sealing material that bonds both substrates, an organic film formed on the TFT array substrate and having a thick film portion provided below the pixel electrode and a thin film portion provided outside the thick film portion, a columnar spacer formed on the opposing substrate and holding substrate gap between the both substrates, and a gap retaining pad formed in a region outside the display region and inside the sealing material to adjust the substrate gap outside the display region according to the substrate gap on the pixel electrode. The columnar spacer holds the substrate gap between both substrates over the gap retaining pad and over the pixel electrode.

2 Claims, 22 Drawing Sheets

U.S. PATENT DOCUMENTS

| | | |
|---|---|---|
| 2005/0206812 A1 | 9/2005 | Tsubata |
| 2007/0024799 A1 | 2/2007 | Kira et al. |
| 2007/0040969 A1 | 2/2007 | Yoshida et al. |
| 2007/0109475 A1* | 5/2007 | Lim et al. ............... 349/114 |
| 2008/0110858 A1 | 5/2008 | Itoh et al. |
| 2008/0123032 A1* | 5/2008 | Taniguchi et al. ............ 349/113 |
| 2009/0046239 A1* | 2/2009 | Watanabe .................. 349/157 |

FOREIGN PATENT DOCUMENTS

| | | |
|---|---|---|
| JP | 2003-57660 | 2/2003 |
| JP | 2003-202551 | 7/2003 |
| JP | 2005-215277 | 8/2005 |
| JP | 2005-266011 | 9/2005 |
| JP | 2005-352479 A | 12/2005 |
| JP | 2006-154189 | 6/2006 |
| JP | 2006-267334 A | 10/2006 |
| JP | 2007-34190 | 2/2007 |
| JP | 2007-218999 A | 8/2007 |
| JP | 2007-334024 A | 12/2007 |
| JP | 2008-147613 | 6/2008 |

* cited by examiner

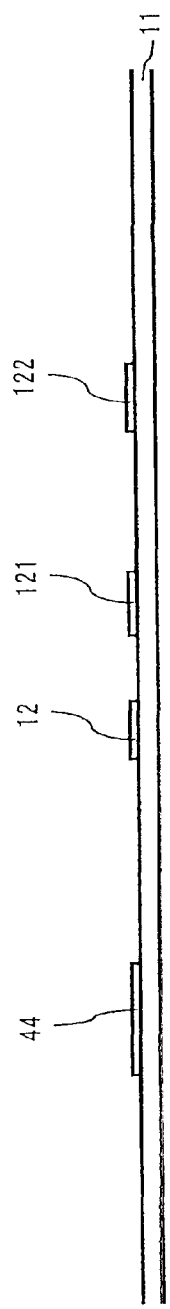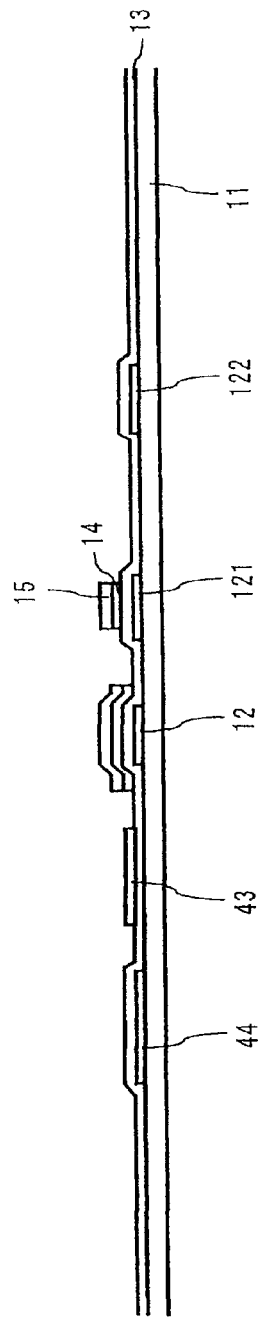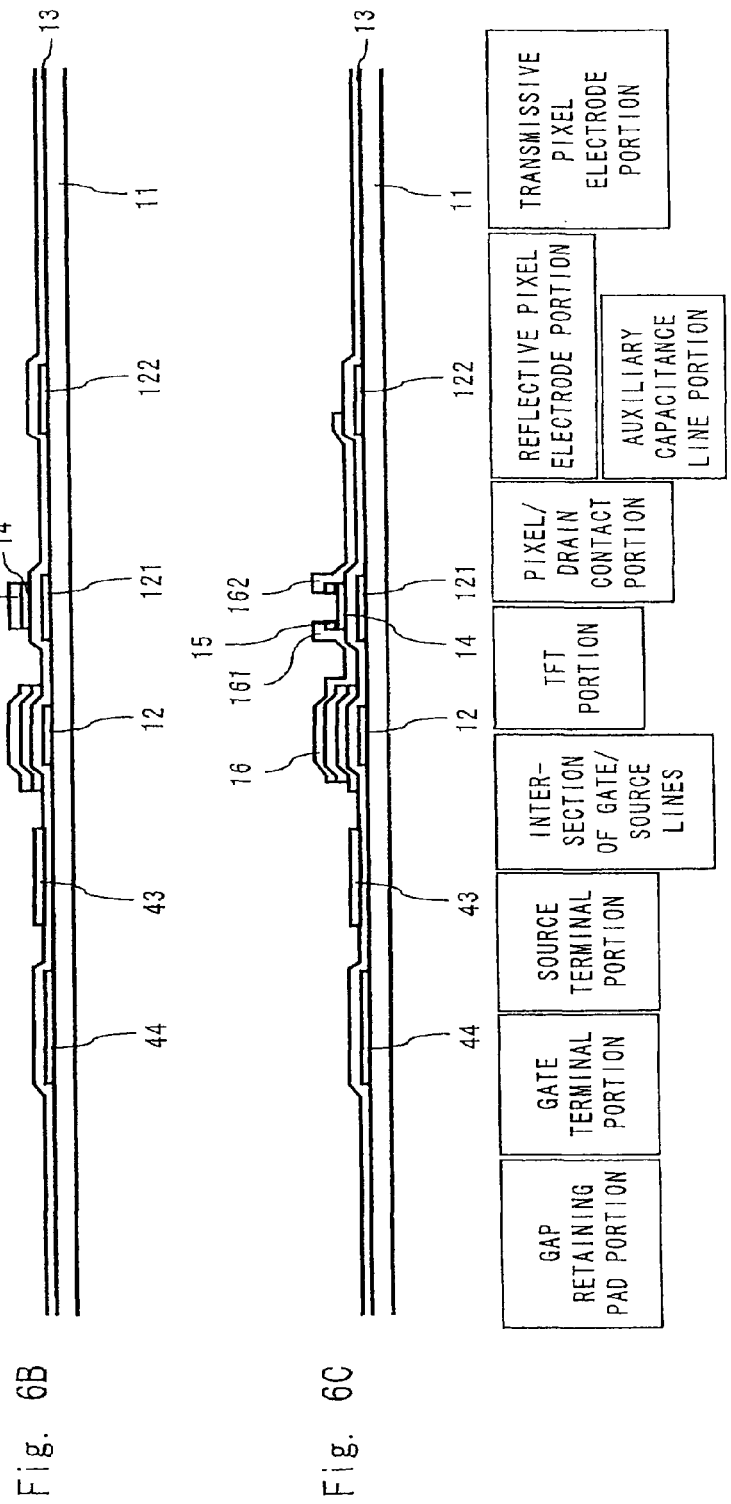

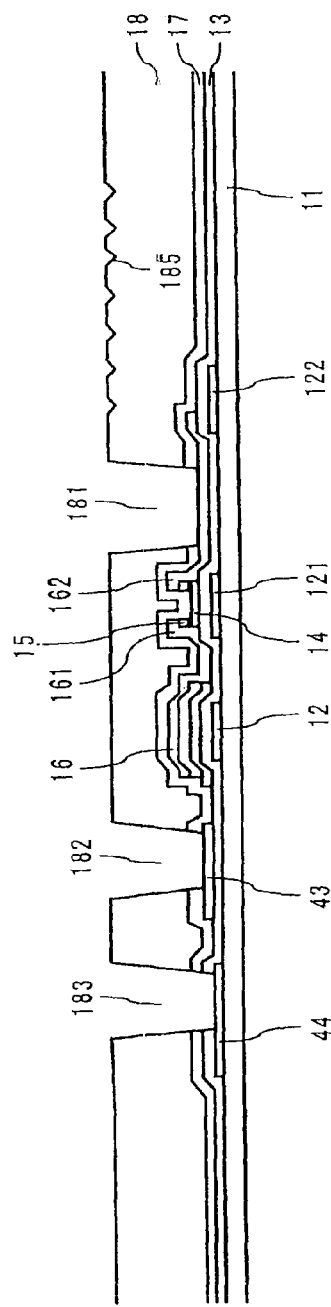
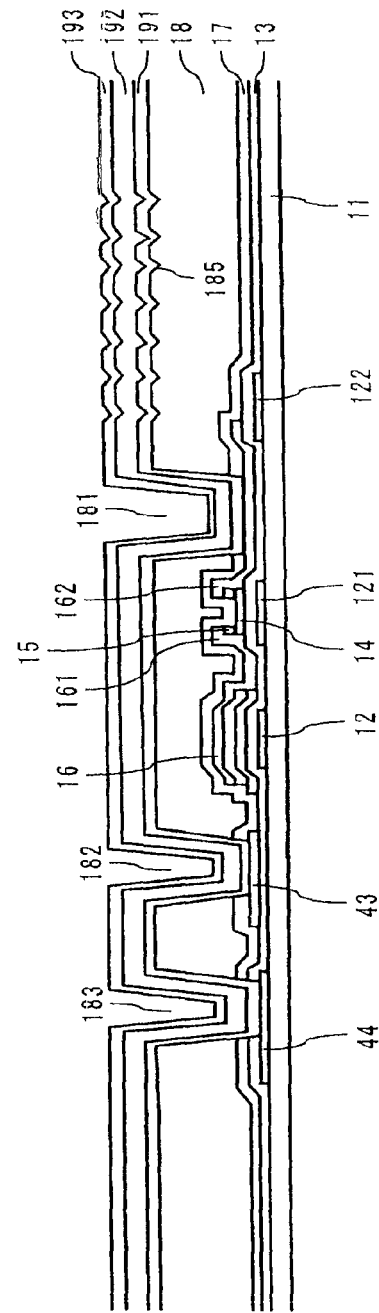
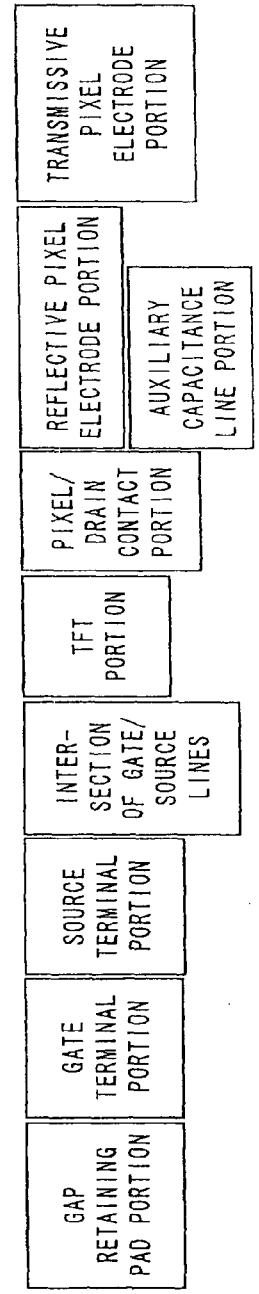
Fig. 6D
Fig. 6E

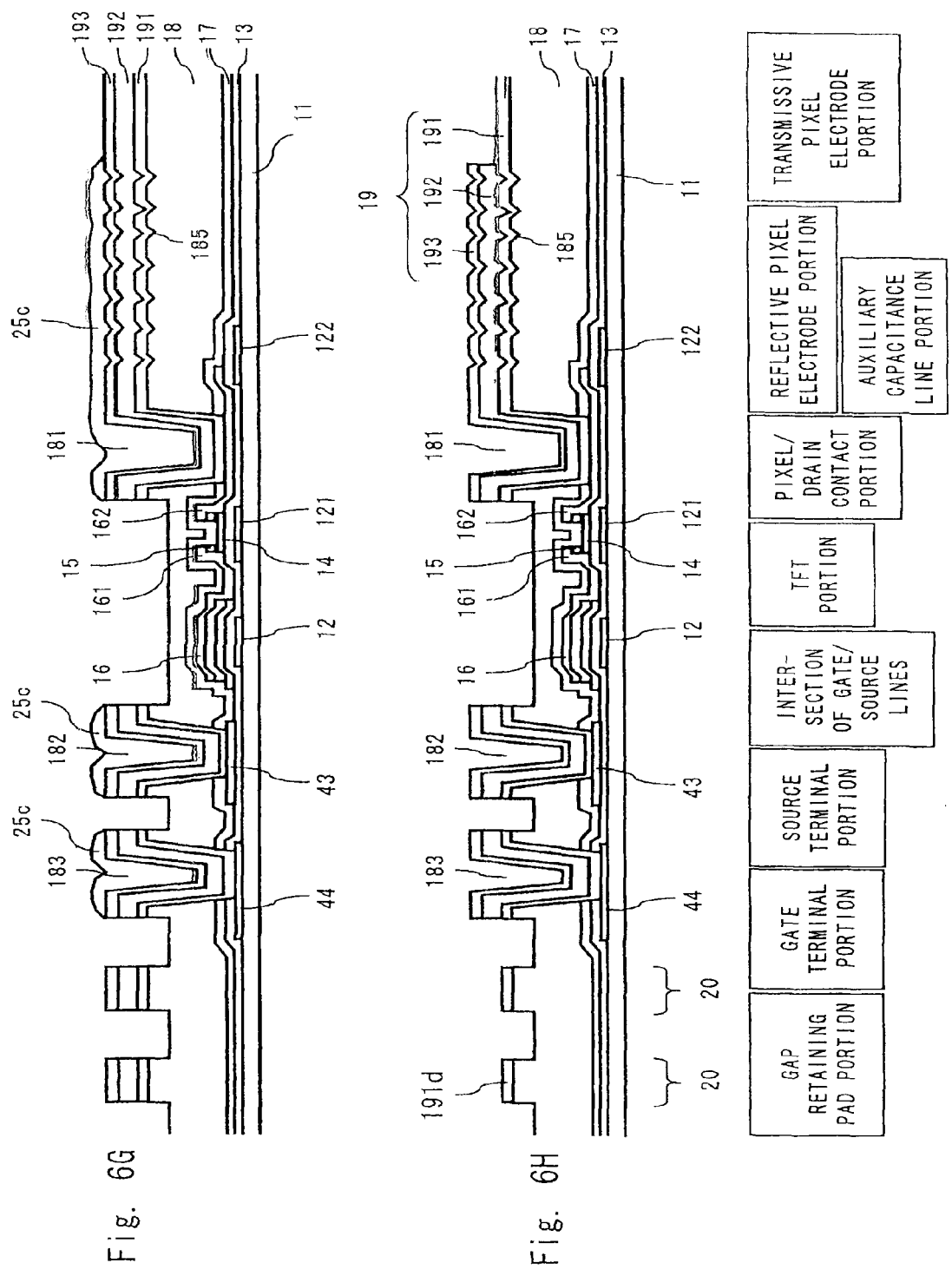

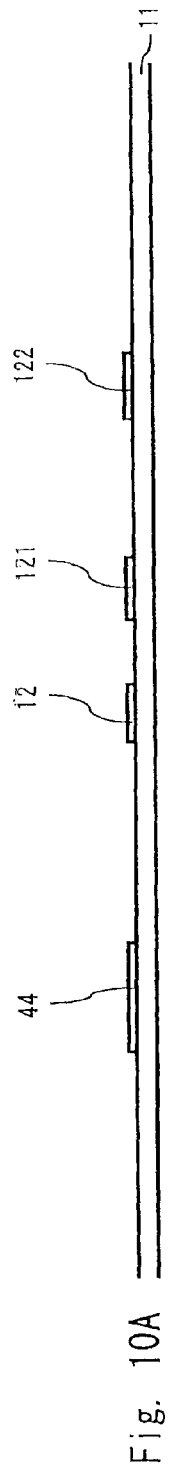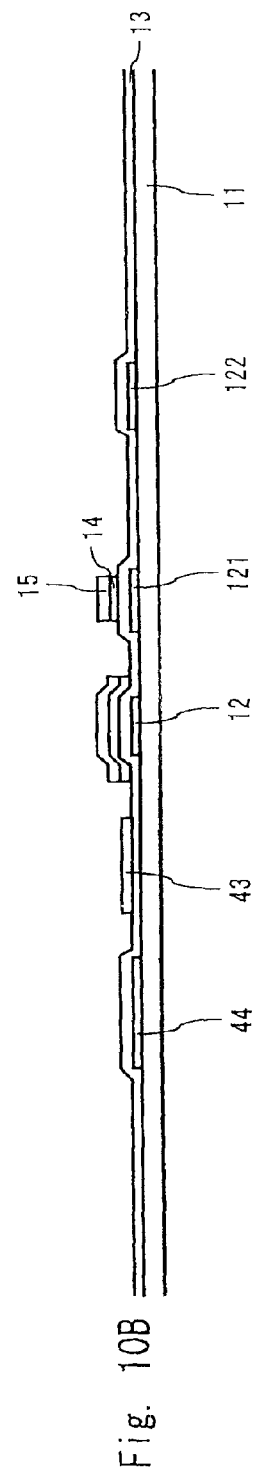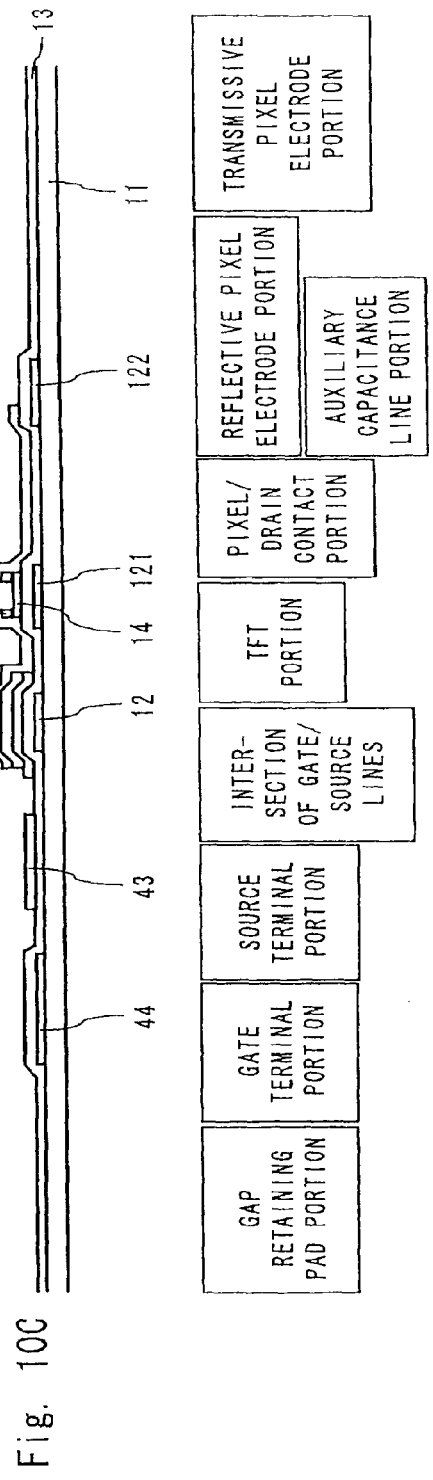

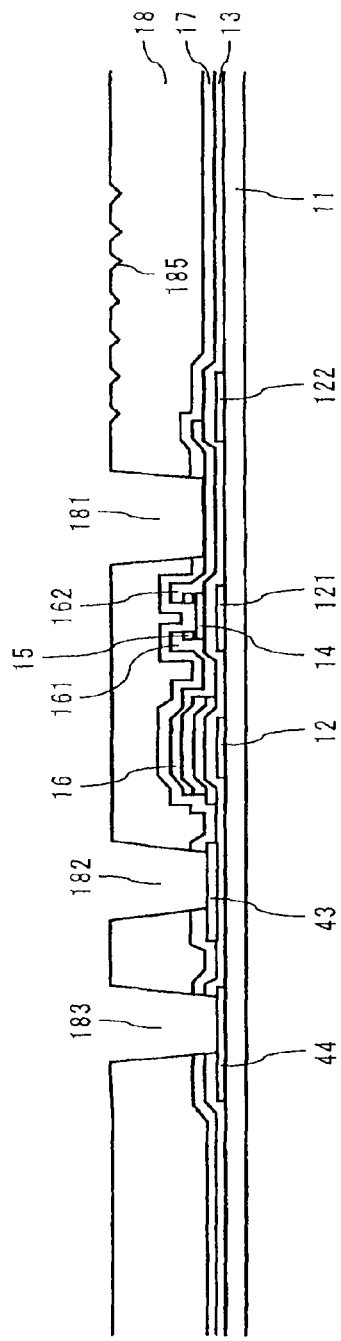
Fig. 10D
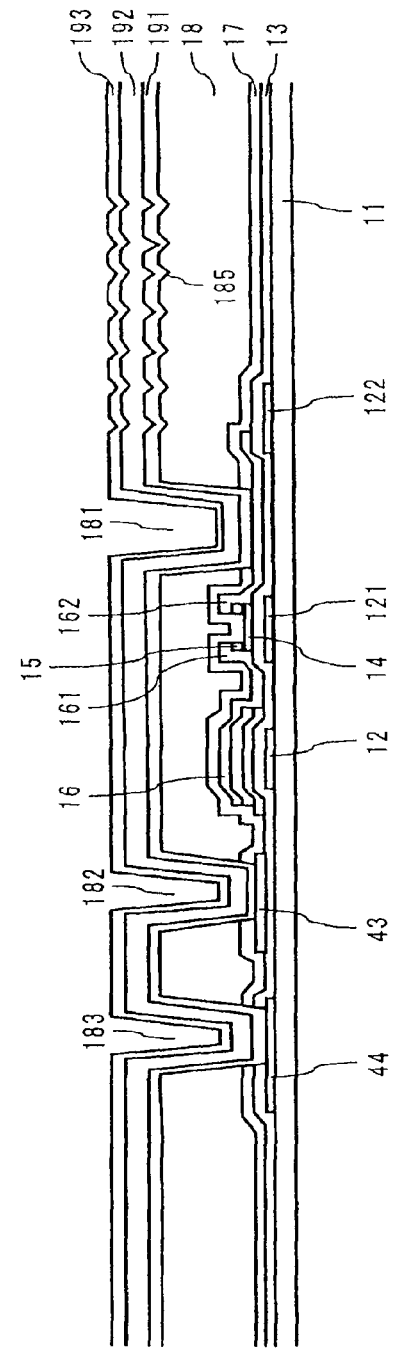
Fig. 10E
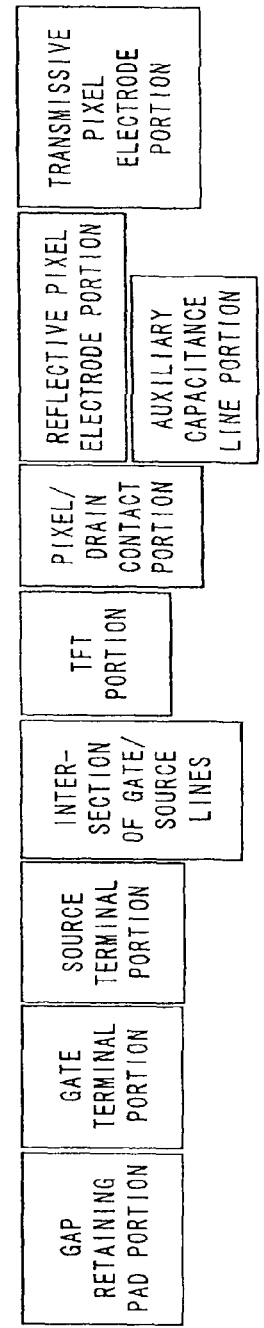

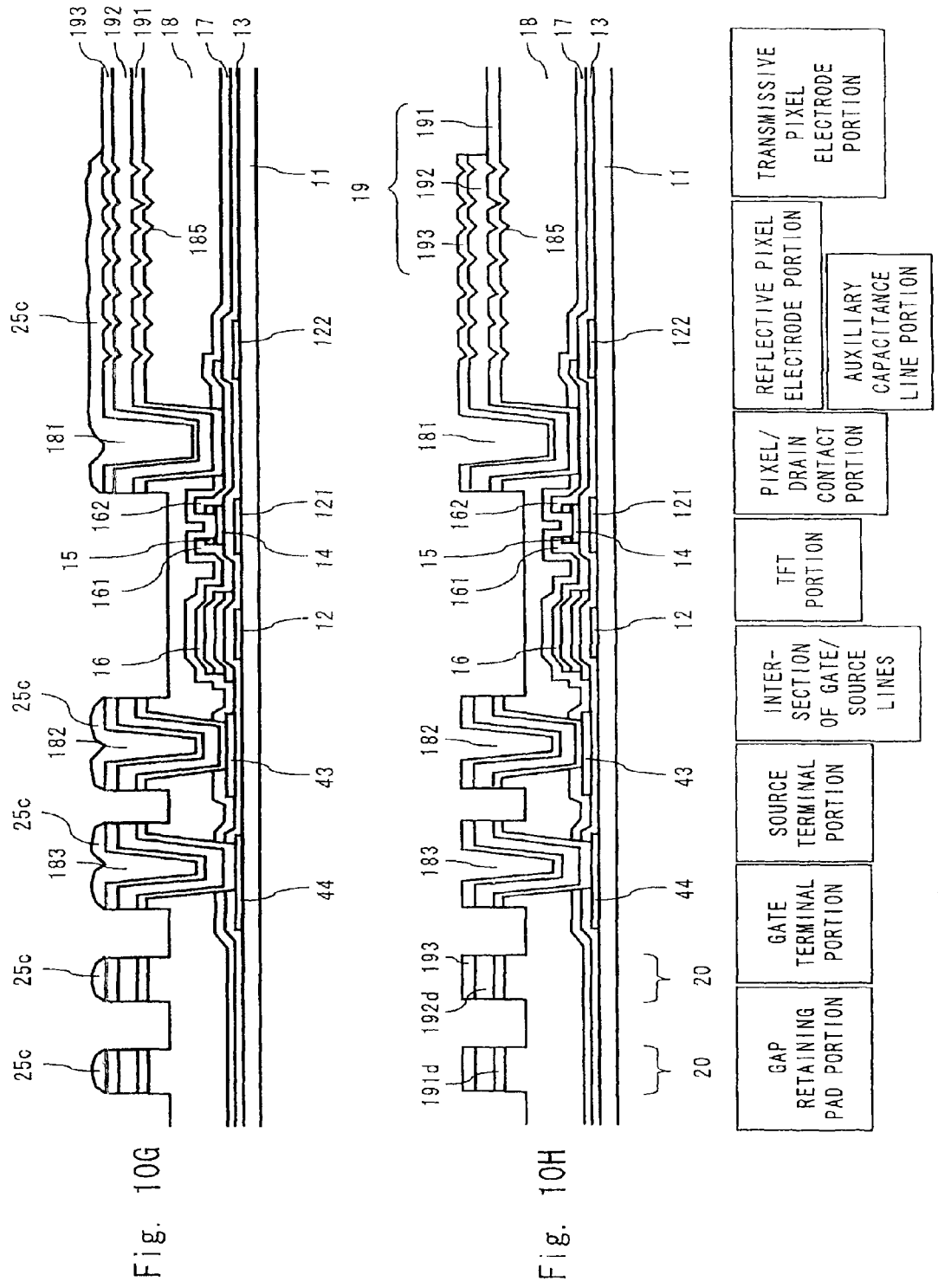

US 8,471,987 B2

LIQUID CRYSTAL DISPLAY DEVICE

The present application is a divisional application of U.S. patent application Ser. No. 12/432,320, filed on Apr. 29, 2009, which claims priority under 37 C.F.R. §119 to Japanese application no. 2008-118345 filed Apr. 30, 2008, the entire contents of each of which are incorporated herein by reference.

BACKGROUND OF THE INVENTION

1. Field of the Invention

The present invention relates to a liquid crystal display device.

2. Description of Related Art

A display device using a liquid crystal has been broadly applied to a product that consumes low power and is thin type as one of flat panel displays used in place of a CRT.

A liquid crystal display device (LCD) includes a simple matrix type LCD and a TFT-LCD that uses a thin film transistor (TFT) as a switching element. The TFT-LCD is superior to the CRT or the simple matrix type LCD in terms of portability and display quality, and has been broadly used in a lap top computer and so on. In general, in the TFT-LCD, a liquid crystal layer is disposed between a TFT array substrate having the TFT formed thereon in array and an opposing substrate. Then, a polarizing plate is placed on the outer surfaces of the opposing substrate and the TFT array substrate, and a light source is further provided on one side. By having such a structure, excellent display can be realized in the TFT-LCD.

The TFT-LCD includes a reflective type TFT-LCD that displays images by reflecting a light that is externally incident by a reflector in addition to a transmissive type TFT-LCD that displays images by transmitting a light of a backlight embedded as a light source. Further, there is also a transflective TFT-LCD that uses both the transmissive and reflective methods. In the transflective liquid crystal display device, reflection of daylight is used under bright ambient light, and a backlight is used under dark ambient light, and thus, excellent display characteristics can be obtained under both indoor and outdoor circumstances. In recent years, as mobile display devices have been widely used, there has been a growing demand on the transflective TFT-LCD panel for a small-sized display such as a portable telephone and a portable music player, and a medium-sized display such as a portable video player, a PDA, and an in-vehicle navigation.

In the TFT-LCD, the TFT needs to be formed on a glass substrate to have an array shape using a semiconductor technique in manufacturing the TFT array substrate, which requires large number of processes. As such, large number of devices are needed for the manufacture and the manufacturing cost becomes high. Especially, in the transflective TFT-LCD, both of the reflective pixel electrode and the transmissive pixel electrode need to be formed, which increases the manufacturing cost as larger number of processes are required compared with the general transmissive TFT-LCD or the reflective TFT-LCD.

For example, Japanese Unexamined Patent Application Publication No. 2005-215277 discloses a technique of reducing the number of photomasks used for manufacturing the TFT array substrate of the transflective TFT-LCD. In Japanese Unexamined Patent Application Publication No. 2005-215277, the reflective pixel electrode and the transmissive pixel electrode of the pixel electrode are formed by one photolithography using a halftone exposure technique. Accordingly, the TFT array substrate that is conventionally formed by six photolithography processes can be formed by five photolithography processes in Japanese Unexamined Patent Application Publication No. 2005-215277, which means the number of photomasks can be reduced.

When the reflective pixel electrode and the transmissive pixel electrode are formed by one photolithography using the method disclosed in Japanese Unexamined Patent Application Publication No. 2005-215277, after forming the transparent conductive layer to serve as the transmissive pixel electrode and the reflective metal layer to serve as the reflective pixel electrode, the resist pattern having a difference in film thickness is firstly formed. The reflective metal layer is etched using the resist pattern having a difference in film thickness as a mask. Next, the thin film portion of the resist pattern having a difference in film thickness is removed by oxygen plasma processing. After that, the transparent conductive layer is etched using the reflective metal layer and the resist pattern in which the thin film portion is removed as masks. Then, the reflective metal layer is etched again using the resist pattern in which the thin film portion is removed as a mask. As such, the reflective metal layer of the transmissive pixel portion is removed to form the reflective pixel electrode and the transmissive pixel electrode.

In general, in order to remove the thin film portion of the resist pattern having a difference in film thickness, ashing for oxidatively decomposing the resist by a dry etcher such as oxygen plasma processing, for example, is performed. However, according to the method disclosed in Japanese Unexamined Patent Application Publication No. 2005-215277, the ashing is carried out with a state in which the transparent conductive layer is exposed on the surface, which may cause abnormal discharge. The abnormal discharge causes damage not only to the transparent conductive layer but also to an organic film provided therebelow. Further, failure may be caused such as disconnection of a line provided in a lower layer.

On the other hand, there is also a method of removing the exposed transparent conductive layer in advance before the ashing in order to prevent the abnormal discharge in the ashing. More specifically, the transparent conductive layer and the reflective metal layer are etched using the resist pattern having a difference in film thickness as a mask, followed by the ashing, and then, the reflective metal layer is etched again using the resist pattern where the thin film portion is removed as a mask. As is similar to the method disclosed in Japanese Unexamined Patent Application Publication No. 2005-215277, this method also enables to form the reflective pixel electrode and the transmissive pixel electrode by one photolithography.

However, according to this method, the transparent conductive layer is removed, and thus, the underlayer organic film is exposed on the surface. In the transflective liquid crystal display device, the organic film having a concave and convex pattern on the surface is provided below the pixel electrode in order to obtain excellent scattering characteristics. The thickness of the organic film of the exposed portion is decreased as is similar to the resist pattern due to the ashing to remove the thin film portion of the resist pattern having a difference in film thickness. Accordingly, the film thickness of the organic film covered with the transparent conductive layer and the film thickness of the organic film which is not covered with the transparent conductive layer greatly vary with each other.

A cross sectional view of the related liquid crystal display device using the thus-formed TFT array substrate is shown in FIG. 17. In FIG. 17, a TFT array substrate 10 and an opposing substrate 30 are arranged opposite to each other. Then, a liquid crystal layer 36 is disposed in a space with a sealing material 37 that bonds the both substrates. The sealing material 37 is formed to have a frame shape so as to surround the display region of the liquid crystal display device.

In the TFT array substrate 10, a gate line (not shown) and a source line (not shown) are formed over a substrate with an insulating film (not shown) interposed therebetween. Then, an organic film 18 is provided in the upper layer of the gate line, the source line, and the insulating film. On the organic film 18, a pixel electrode 19 where a transmissive pixel electrode 191 and a reflective pixel electrode 192 are stacked is formed in each pixel. A region where the pixel electrodes 19 are arranged in matrix is a display region 41. The film thickness of the organic film 18 covered with the transparent conductive layer is different from the film thickness of the organic film 18 which is not covered with the transparent conductive layer. Thus, in a part which is not covered with the transparent conductive layer, which means in a region between pixels and a frame region 42, the film thickness of the organic film 18 is thinner than that in the pixel region.

In the opposing substrate 30, a BM 32, a color material 33, and an opposing electrode 34 and so on are formed over a substrate. Then, a columnar spacer 35 to determine the gap with the opposing TFT array substrate 10 is provided on the opposing electrode 34. The columnar spacer 35 is formed in the display region 41 and the frame region 42. More specifically, in the display region 41, the columnar spacer 35 is arranged in a position opposed to the reflective pixel electrode 192. On the other hand, in the frame region 42, the columnar spacer is arranged in a region from outside the display region 41 to inside the sealing material 37. However, the organic film 18 in this part has a smaller film thickness than that of the pixel region as described above. Accordingly, as shown in FIG. 17, it is impossible to keep the gap between the both substrates even, which causes a gap failure. Due to this gap failure, the display failure such as the display unevenness occurs at the periphery of the display region 41 (peripheral gap unevenness), which degrades the display quality of the liquid crystal display device.

In recent years, the glass substrate that is used for both the TFT array substrate 10 and the opposing substrate 30 has been thinner and thinner in order to realize the reduction in thickness and weight required in the liquid crystal panel, which decreases the mechanical strength. Furthermore, a plastic substrate may be alternatively used, although it has not been common yet. Under such circumstances, the substrate is deformed by the pressure from inside and outside of the cell which is applied in bonding the TFT array substrate 10 together with the opposing substrate 30 for making a panel, which makes it more and more difficult to keep the gap between the both substrates even.

The present invention has been made in order to solve the above-described problems, and aims to provide a liquid crystal display device with excellent display quality.

SUMMARY OF THE INVENTION

According to a first aspect of the present invention, there is provided a liquid crystal display device having a pixel electrode including a transmissive pixel electrode and a reflective pixel electrode that is formed in a part of the transmissive pixel electrode, the liquid crystal display device comprising an array substrate including the pixel electrode formed thereon, an opposing substrate arranged to be opposed to the array substrate, a sealing material formed in a frame shape to surround a display region, the sealing material bonding the array substrate with the opposing substrate, an organic film formed on the array substrate, the organic film having a thick film portion provided below the pixel electrode and a thin film portion that is provided outside the thick film portion, a columnar spacer formed on the opposing substrate and holding substrate gap between the array substrate and the opposing substrate, and a gap retaining pad formed in a region outside the display region and inside the sealing material, the gap retaining pad adjusting the substrate gap outside the display region according to the substrate gap on the pixel electrode, in which the columnar spacer holds the substrate gap between the array substrate and the opposing substrate over the gap retaining pad and over the pixel electrode.

According to a second aspect of the present invention, there is provided a liquid crystal display device having a pixel electrode including a transmissive pixel electrode and a reflective pixel electrode that is formed in a part of the transmissive pixel electrode, the liquid crystal display device including an array substrate including the pixel electrode formed thereon, an opposing substrate arranged to be opposed to the array substrate, a sealing material formed in a frame shape to surround a display region, the sealing material bonding the array substrate with the opposing substrate, an organic film formed on the array substrate, the organic film having a concave and convex pattern below the reflective pixel electrode, an inorganic insulating film formed on the organic film, and a columnar spacer formed on the opposing substrate and holding substrate gap between the array substrate and the opposing substrate in a region outside the display region and inside the sealing material and in the region over the pixel electrode.

According to a third aspect of the present invention, there is provided a liquid crystal display device having a pixel electrode including a transmissive pixel electrode and a reflective pixel electrode that is formed in a part of the transmissive pixel electrode, the liquid crystal display device including an array substrate including the pixel electrode formed thereon, an opposing substrate arranged to be opposed to the array substrate, a sealing material formed in a frame shape to surround a display region, the sealing material bonding the array substrate with the opposing substrate, an organic film formed on the array substrate, the organic film having a thick film portion provided below the pixel electrode and a thin film portion that is provided outside the thick film portion, a columnar spacer formed on the opposing substrate and holding substrate gap between the array substrate and the opposing substrate, in which the columnar spacer includes a first columnar spacer formed in a position opposed to the pixel electrode and a second columnar spacer formed in a region outside the display region and inside the sealing material, and the second columnar spacer is formed to be higher than the first columnar spacer according to a difference between the substrate gap outside the display region and the substrate gap over the pixel electrode.

According to the present invention, it is possible to provide a liquid crystal display device with excellent display quality.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIGS. 6A to 6H are cross sectional views showing the manufacturing process of the TFT array substrate according to the first embodiment;

FIGS. 10A to 10H are cross sectional views showing the manufacturing process of a TFT array substrate according to the second embodiment;

DESCRIPTION OF THE EXEMPLARY EMBODIMENTS

Figure 1:
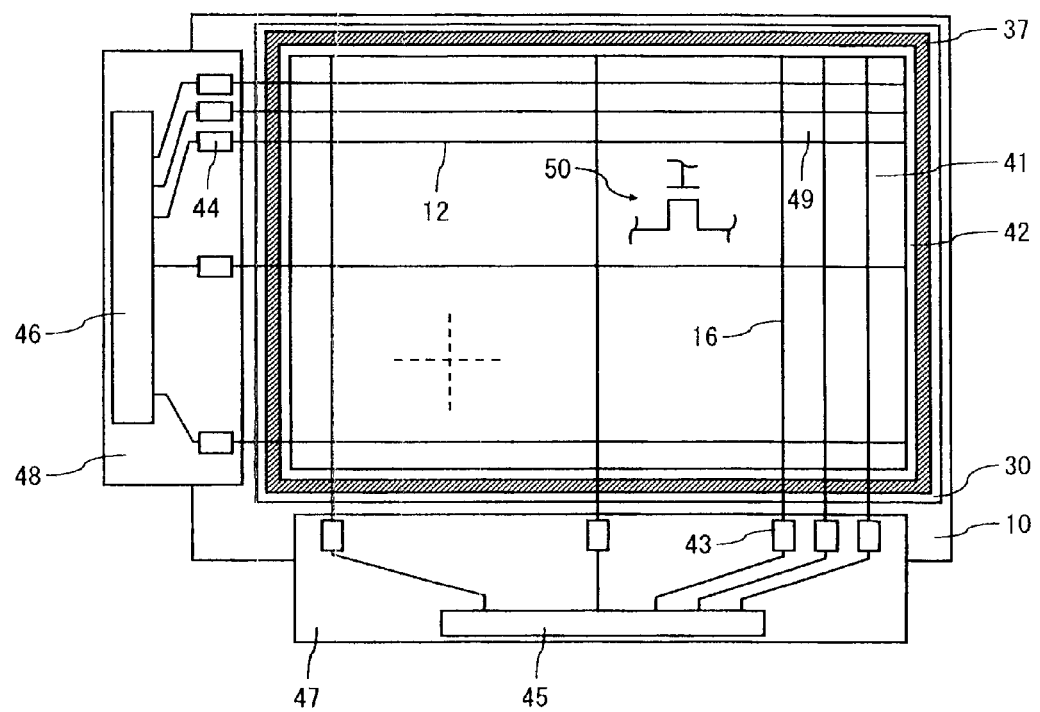
FIG. 1 is a front view showing the structure of a liquid crystal display device according to a first embodiment.

The preferred embodiments of the present invention will now be described in detail. The following description will be made of the embodiments of the present invention, and the present invention is not limited to the following embodiments. Some parts of the following description and the drawings are omitted and simplified as appropriate for the sake of clarity. Further, the overlapping description is omitted as needed for the sake of simplicity. Note that the same components in the drawings are denoted by identical reference numerals, and the description is omitted as appropriate.

First Embodiment

Referring first to FIG. 1, a liquid crystal display device according to the first embodiment will be described. FIG. 1 is a front view showing the structure of the liquid crystal display device according to the first embodiment. The liquid crystal display device according to the first embodiment is a transflective liquid crystal display device including a transmissive region and a reflective region in one pixel. The overall structure of the liquid crystal display device is common throughout the first to sixth embodiments described below.

The liquid crystal display device according to the present invention includes a liquid crystal display panel 1. In the liquid crystal display panel 1, a thin film transistor (TFT) array substrate 10 and an opposing substrate 30 are arranged opposite to each other.

The TFT array substrate 10 has a display region 41 and a frame region 42 surrounding the display region 41. In the display region 41, a plurality of gate lines (scanning signal lines) 12 and a plurality of source lines (display signal lines) 16 are formed. The plurality of gate lines 12 are arranged in parallel. Likewise, the plurality of source lines 16 are arranged in parallel. The gate lines 12 and the source lines 16 cross each other. The gate lines 12 and the source lines 16 are orthogonal to each other. A region surrounded by the adjacent gate lines 12 and the source lines 16 is a pixel 49. Thus, the pixels 49 are arranged in matrix in the TFT array substrate 10.

Further, a flexible substrate 47 to which a control circuit 45 is mounted and a flexible substrate 48 to which a control circuit 46 is mounted are connected to the frame region 42 of the TFT array substrate 10. The gate line 12 extends from the display region 41 to the frame region 42. Then, the gate line 12 is connected with the control circuit 46 through a gate line terminal (gate terminal) 44 at the end of the TFT array substrate 10. Likewise, the source line 16 extends from the display region 41 to the frame region 42. Then, the source line 16 is connected with the control circuit 45 through a source line terminal (source terminal) 43 at the end of the TFT array substrate 10.

Various signals are externally supplied to the control circuits 45 and 46. The control circuit 46 supplies a gate signal (scanning signal) to the gate line 12 based on the external control signal. The gate lines 12 are successively selected in accordance with the gate signal. The control circuit 45 supplies a display signal to the source line 16 based on the external control signal or display data. As a result, the display voltage corresponding to the display data can be supplied to each pixel 49. Incidentally, the control circuit 45 may be separately mounted on the liquid crystal display panel 1, the flexible substrate 47, and an FPC (Flexible Printed Circuit) (not shown). Likewise, the control circuit 46 may be separately mounted on the liquid crystal display panel 1, the flexible substrate 48, and the FPC. Further, a part of the control circuits 45, 46 may be formed on the TFT array substrate 10.

In each pixel 49, at least one TFT 50 is formed. The TFT 50 is arranged in the vicinity of an intersection of the source line 16 with the gate line 12. For example, this TFT 50 supplies the display voltage to a pixel electrode. The TFT 50 which is a switching element is turned on in accordance with the gate signal from the gate line 12. As such, the display voltage is applied from the source line 16 to the pixel electrode connected to a drain electrode of the TFT 50. Then, an electric field corresponding to the display voltage is generated between the pixel electrode and an opposing electrode. Note that an orientation film (not shown) is formed on the surface of the TFT array substrate 10. The detailed structure in the pixel 49 will be described later.

On the other hand, the opposing substrate 30 is a color filter substrate, for example, and is placed on the display screen side. On the opposing substrate 30, a color filter (color material), a black matrix (BM), the opposing electrode, the orientation film and the like are formed. The detailed structure of the opposing substrate 30 will be described later. Note that the opposing electrode may be placed in the TFT array substrate 10 side. The TFT array substrate 10 and the opposing substrate 30 are attached together through a sealing material 37. The sealing material 37 is provided to have a frame shape so as to surround the display region 41. Then, a liquid crystal layer 36 is interposed between the TFT array substrate 10 and the opposing substrate 30. That is, liquid crystal is filled in between the TFT array substrate 10 and the opposing substrate 30. Further, a polarizing plate, a retardation plate and the like are placed on the outer surfaces of the TFT array substrate 10 and the opposing substrate 30. Further, a backlight unit or the like is arranged on the opposite side to the display screen of the liquid crystal display panel 1.

Liquid crystal is driven by an electric field generated between the pixel electrode and the opposing electrode. That is, an orientation direction of the liquid crystal between the substrates is changed. As a result, a polarization state of light transmitted through the liquid crystal layer is changed. That is, a polarization state of the light that has turned into linearly-polarized light through the polarizing plate is changed by the liquid crystal layer 36. More specifically, in the transmissive region, light from a backlight unit is turned into linearly-polarized light by the polarizing plate arranged in the TFT array substrate side. Then, a polarization state is changed by the linearly-polarized light passing through the retardation plate in the opposing substrate 30, the liquid crystal layer 36, and the retardation plate in the TFT array substrate 10 side. On the other hand, in the reflective region, light from the display screen side of the liquid crystal display panel is turned into linearly-polarized light by the polarizing plate arranged in the opposing substrate 30 side. Then, a polarization state is changed by the linearly-polarized light reciprocating in the retardation plate in the opposing substrate 30 side and the liquid crystal layer 36.

An amount of light transmitted through the polarizing plate on the opposing substrate 30 side is changed in accordance with the polarization state. That is, an amount of light transmitted through the polarizing plate on the display screen side out of the transmitted light that is emitted from the backlight unit and transmitted through the liquid crystal display panel 1 and the reflected light that is reflected in the liquid crystal display panel 1 is changed. The orientation direction of liquid crystal is changed in accordance with the applied display voltage. Hence, the display voltage is controlled to thereby change an amount of light transmitted through the polarizing plate on the display screen side. That is, different display voltages are applied to the pixels to thereby display a desired image.

Figure 2:
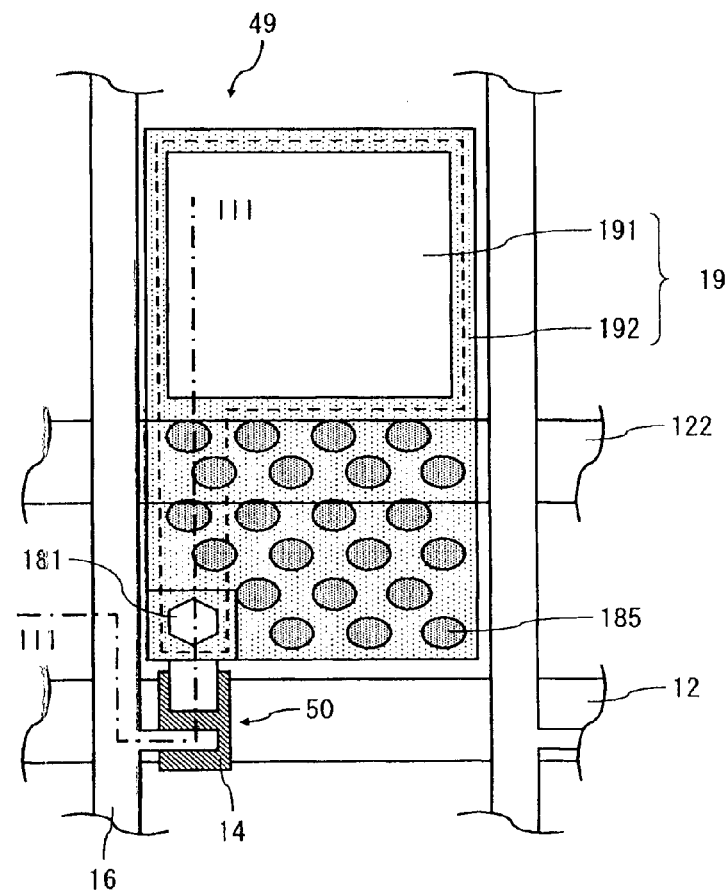
FIG. 2 is a plane view showing the pixel structure of a TFT array substrate according to the first embodiment.
Figure 3:
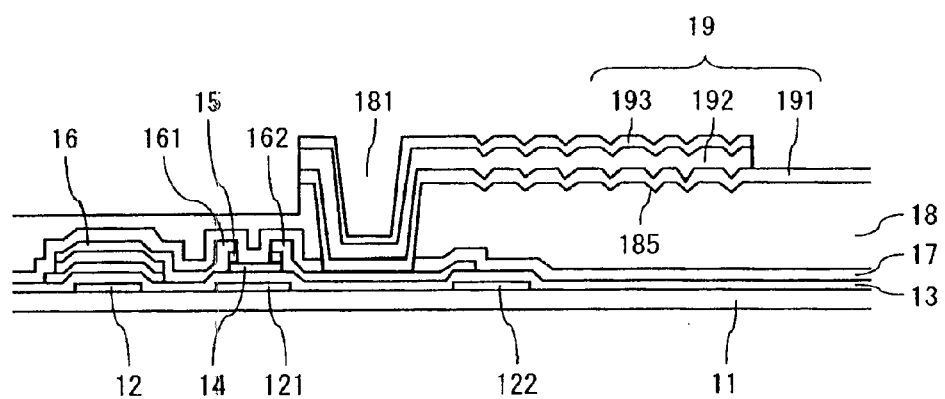
FIG. 3 is a cross sectional view taken along the line of FIG. 2.

Next, the pixel structure of the TFT array substrate 10 will be described in detail with reference to FIGS. 2 and 3. FIG. 2 is a plane view showing the pixel structure of the TFT array substrate 10 according to the first embodiment. FIG. 3 is a cross sectional view taken along the line of FIG. 2. FIG. 2 is a plane view showing one of the pixels 49 on the TFT array substrate 10. On the TFT array substrate 10, the plurality of pixels 49 are arranged in matrix. Note that, in the first embodiment, description is made of a case in which a channel-etch type TFT 50 is formed as an example.

In FIGS. 2 and 3, in the TFT array substrate 10, the gate line 12, a part of which forming a gate electrode 121, is formed on a transparent insulating substrate 11 such as a glass or a plastic. Accordingly, the gate line 12 is electrically connected to the gate electrode 121 of the TFT 50.

On the substrate 11, an auxiliary capacitance electrode 122 is formed by the same layer as the gate line 12. The auxiliary capacitance electrode 122 is arranged apart from the gate line 12, and extends in parallel with the gate line 12. In other words, the auxiliary capacitance electrode 122 is arranged between the adjacent gate lines 12. In this example, the auxiliary capacitance electrode 122 is arranged in the reflective region of the pixel 49. The auxiliary capacitance electrode 122 forms a retention capacity to enable the stable display with a pixel electrode 19 described below. The retention capacity retains the driving voltage from the TFT 50 even after the TFT 50 connected to each pixel 49 is turned off.

The gate line 12, the gate electrode 121, and the auxiliary capacitance electrode 122 are formed of Mo having a film thickness of 250 nm, for example.

A gate insulating film 13 is formed so as to cover the gate line 12, the gate electrode 121, and the auxiliary capacitance electrode 122. The gate insulating film 13 is formed of SiN having a film thickness of 400 nm, for example. A semiconductor layer 14 is arranged on the opposite surface of the gate electrode 121 with the gate insulating film 13 interposed therebetween. The semiconductor layer 14 is formed of an amorphous silicon (a-Si (i)) or the like having a film thickness of 130 nm, for example.

Further, an ohmic contact film 15 into which conductive impurities are doped is formed on each end of the semiconductor layer 14. The regions of the semiconductor layer 14 corresponding to the ohmic contact films 15 are source/drain regions. More specifically, the region of the semiconductor layer 14 corresponding to the ohmic contact film 15 in the left side of FIG. 3 is a source region. Then, the region of the semiconductor layer 14 corresponding to the ohmic contact film 15 in the right side of FIG. 3 is a drain region. As such, the source/drain regions are formed in both ends of the semiconductor layer 14. Then, the part of the semiconductor layer 14 between the source and the drain regions is a channel region. The ohmic contact film 15 is not formed on the channel region of the semiconductor layer 14. The ohmic contact film 15 is formed of an n type amorphous silicon (a-Si (n)), where impurities such as phosphorus (P) or the like are heavily doped, for example, to have a film thickness of 50 nm.

On the ohmic contact films 15, a source electrode 161 and a drain electrode 162 are formed. More specifically, the source electrode 161 is formed on the ohmic contact film 15 in the source region side. Then, the drain electrode 162 is formed on the ohmic contact film 15 in the drain region side. The channel-etch type TFT 50 is thus formed. Then, the source electrode 161 and the drain electrode 162 are formed so as to extend toward the outside of the channel region of the semiconductor layer 14. In summary, the source electrode 161 and the drain electrode 162 are not formed on the channel region of the semiconductor layer 14 as is similar to the ohmic contact film 15.

The source electrode 161 extends toward the outside of the channel region of the semiconductor layer 14 and is connected to the source line 16. Thus, the source line 16 is electrically connected to the source electrode 161 of the TFT 50. The source line 16 is formed on the gate insulating film 13, and is arranged to linearly extend in a direction in which it crosses the gate line 12 on the substrate 11. As such, the source line 16 is divided at the intersection with the gate line 12 and extends along the gate line 12, and is connected to the source electrode 161. Note that, although not shown in FIG. 2, a stacked film formed of a pattern which is in the same layer as the semiconductor layer 14 and a pattern which is in the same layer as the ohmic contact film 15 may be provided at the intersection of the gate line 12 with the source line 16, as shown in FIG. 3. As such, the insulation resistance between the gate line 12 and the source line 16 can be improved.

On the other hand, the drain electrode 162 extends toward the outside of the channel region of the semiconductor layer 14, and includes an extending portion that extends toward the outside of the TFT 50. The source electrode 161, the drain electrode 162, and the source line 16 are formed of Mo having a film thickness of 300 nm, for example.

An interlayer insulating film 17 is provided so as to cover the source electrode 161, the drain electrode 162, and the source line 16. As such, the interlayer insulating film 17 covers the TFT 50. The interlayer insulating film 17 is formed of SiN having a film thickness of 100 nm. Further, an organic film 18 is stacked on the interlayer insulating film 17. On the drain electrode 162 of the TFT 50, a contact hole 181 is provided in the organic film 18 and the interlayer insulating film 17. The contact hole 181 penetrates the organic film 18 and the interlayer insulating film 17, so as to reach the drain electrode 162 of the TFT 50.

The organic film 18 is an organic resin film that functions as a base layer to form the pixel electrode 19, and planarizes irregularities on the substrate 11 produced by the TFT 50, the auxiliary capacitance electrode 122, the gate line 12, and the source line 16. The liquid crystal display device according to the first embodiment is a transflective one, and the pixel 49 includes a transmissive region and a reflective region. In the reflective region, a concave and convex pattern 185 is formed on the surface of the organic film 18 in order to make a reflected light have a proper scattering distribution. Note that the film thickness of the organic film 18 in the region that is not covered with the pixel electrode 19 described later is thinner than that in the region covered with the pixel electrode 19. In this example, the film thickness of the organic film 18 of the region covered with the pixel electrode 19 is, for example, about 3600 nm.

On the organic film 18, the pixel electrode 19 connected to the drain electrode 162 through the contact hole 181 is provided. The pixel electrode 19 has a single-layer structure of a transmissive pixel electrode 191 in the transmissive region, and has a stacked structure in which a reflective pixel electrode 192 is stacked on the transmissive pixel electrode 191 in the reflective region. In short, the transmissive pixel electrode 191 is provided in both of the transmissive region and the reflective region. The transmissive pixel electrode 191 is, in this example, formed to have a film thickness of 80 nm by the transparent conductive layer such as ITO, IZO, ITZO, ITSO or the like, for example. On the other hand, the reflective pixel electrode 192 is provided only in the reflective region. The reflective pixel electrode 192 is formed of, in this example, a reflective metal layer in which an AlCu film having a film thickness of 300 nm is stacked on an Mo film having a film thickness of 50 nm. Further, in order to adjust the work function with the liquid crystal layer 36 between the transmissive region and the reflective region, the pixel electrode 19 may have an upper transparent conductive layer 193 laminated on the reflective pixel electrode 192 as shown in FIG. 3. In this case, the upper transparent conductive layer 193 is formed of, for example, a transparent conductive layer of ITO, IZO, ITZO, ITSO or the like having a film thickness of 5 nm.

Figure 4:
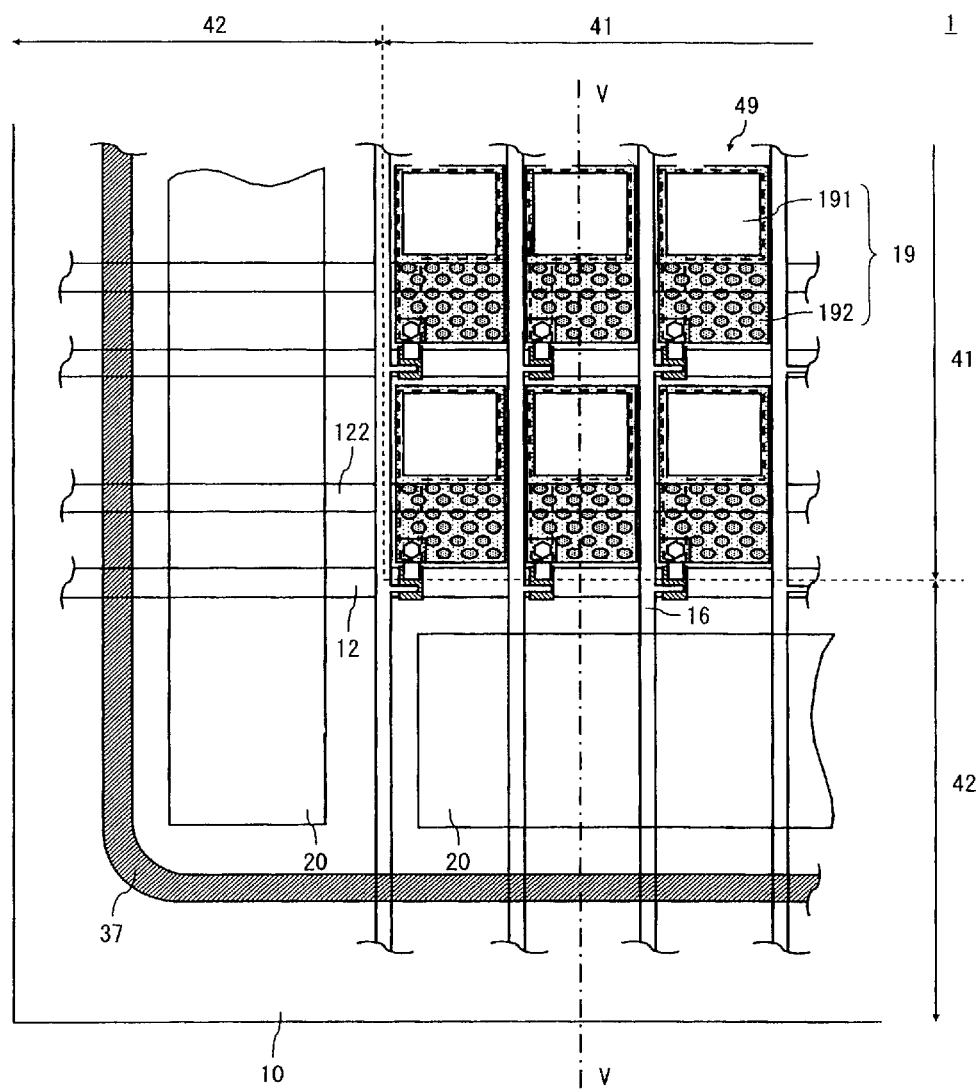
FIG. 4 is an enlarged plane view showing the structure at the periphery of a display region and outside thereof of the liquid crystal display panel according to the first embodiment.
Figure 5:
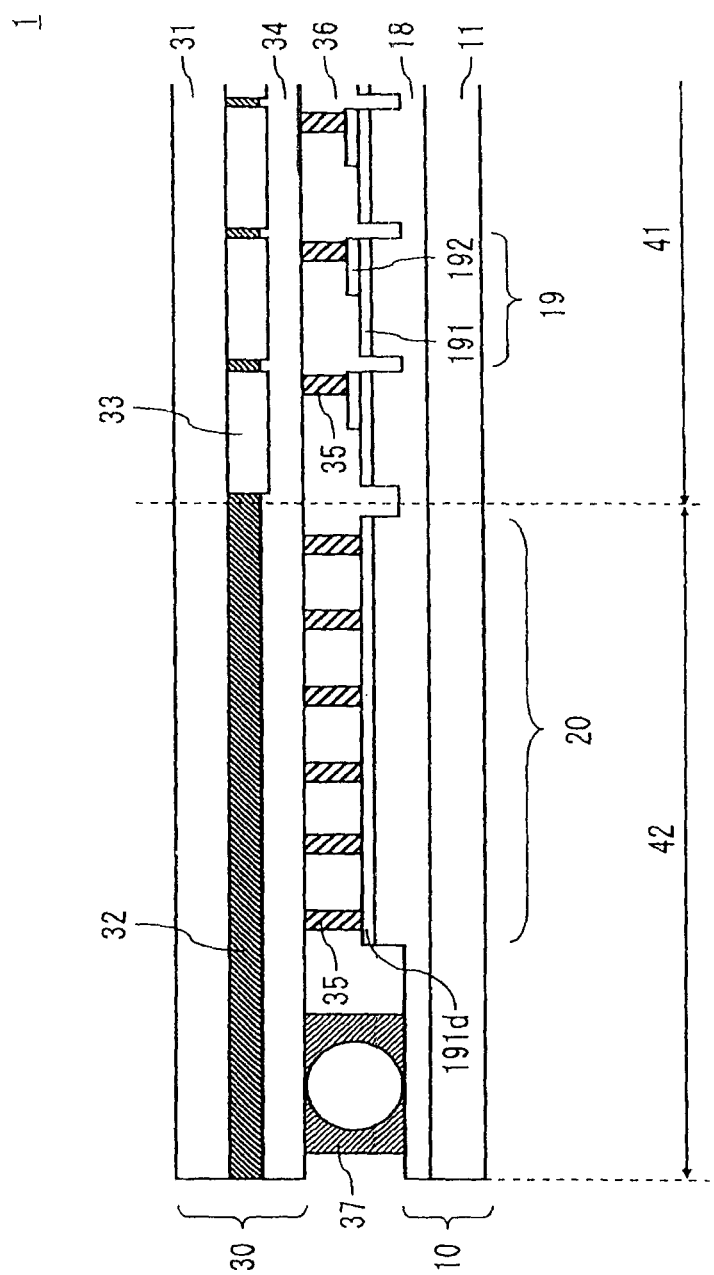
FIG. 5 is a cross sectional view taken along the line V-V of FIG. 4.

Now, the structure at the periphery of the display region 41 and outside thereof of the liquid crystal display panel 1 will be described with reference to FIGS. 4 and 5. FIG. 4 is an enlarged plane view showing the structure at the periphery of the display region 41 and outside thereof of the liquid crystal display panel 1 according to the first embodiment. FIG. 5 is a cross sectional view taken along the line V-V of FIG. 4, and schematically shows the structure at the periphery of the display region 41 and outside thereof of the liquid crystal display panel 1 according to the first embodiment. Note that, in FIG. 4, only the structure of the TFT array substrate 10 side is shown for the sake of convenience, and the structure of the opposing substrate 30 side is omitted. Further, FIG. 5 schematically shows the structure of the TFT array substrate 10, and the components such as the gate line 12, the source line 16, and the TFT 50 or the like are omitted as appropriate.

Figure 17:
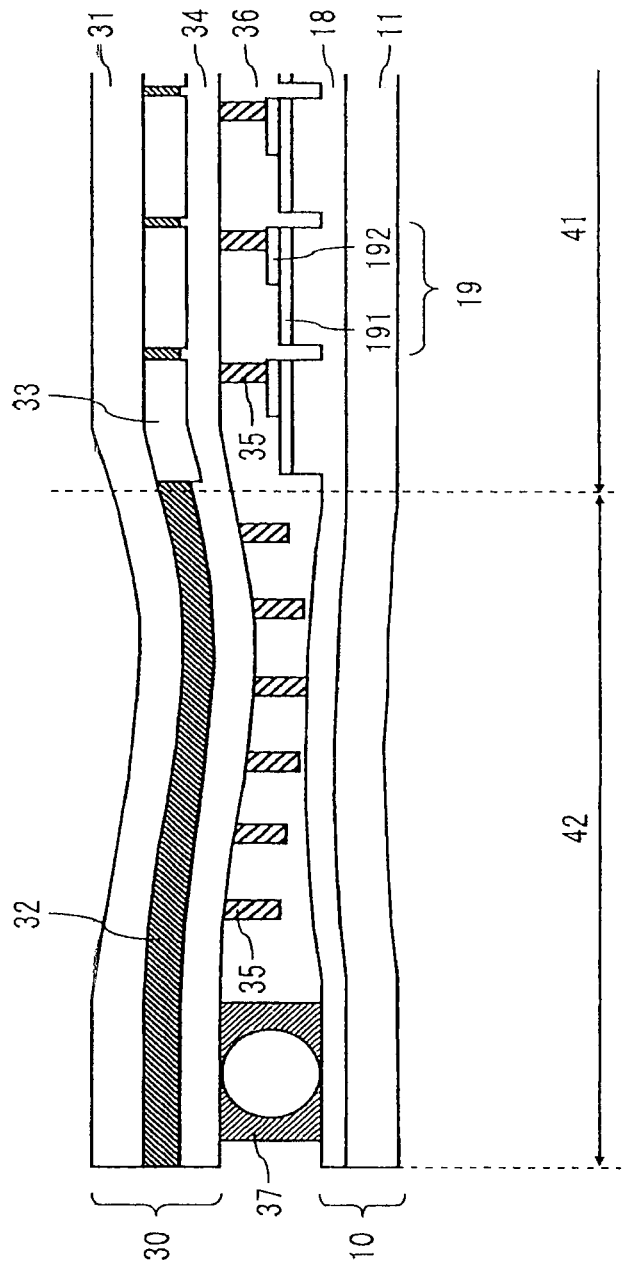
FIG. 17 is a cross sectional view schematically showing the structure at the periphery of a display region and outside thereof of a liquid crystal display panel according to a related art.

In FIGS. 4 and 5, as described in detail in FIGS. 2 and 3, the organic film 18 is provided in the upper layer of the gate line 12, the source line 16, and the TFT 50 over the substrate 11 of the TFT array substrate 10. This organic film 18 is formed substantially on the whole surface of the substrate 11 from the display region 41 to the frame region 42. On the organic film 18, the pixel electrode 19 formed of the lamination of the transmissive pixel electrode 191 and the reflective pixel electrode 192 is formed in each pixel 49. Then, as shown in FIG. 5, in a region where the pixel electrode 19 is provided (pixel region), the film thickness of the organic film 18 is larger than that in a region between the adjacent pixel electrodes 19 (region between pixels), as is similar to the related example shown in FIG. 17. In summary, in the display region 41, the thick film portion of the organic film 18 is formed in the pixel region, and the thin film portion of the organic film 18 is formed in the region between pixels.

Further, in the organic film 18, the thin film portion that is similar as in the region between pixels is formed in the frame region 42 outside the display region 41. In the first embodiment, the thick film portion of the organic film 18 which is similar as in the pixel region is provided in the region from outside the display region 41 to inside the sealing material 37 in the frame region 42. Then, a transparent conductive layer 191d which is in the same layer as the transmissive pixel electrode 191 is formed on the thick film portion of the organic film 18. As described above, according to the first embodiment, a gap retaining pad 20 where the transparent conductive layer 191d is stacked on the thick film portion of the organic film 18 is provided in a region outside the display region 41 and inside the sealing material 37.

The gap retaining pads 20 are, as shown in FIG. 4, for example, formed to have a strip shape along each side of the sealing material 37 having the frame shape.

The opposing substrate 30 is attached to the TFT array substrate 10 through the sealing material 37. As shown in FIG. 5, the opposing substrate 30 includes a black matrix 32 that is formed of a metal such as chrome, pigment or the like to shield the light on the surface of the substrate 31 that is opposed to the TFT array substrate 10. The black matrix 32 is provided in a region that is opposed to the source line 16 and the gate line 12, and is formed to have a lattice shape. Further, the black matrix 32 is formed to have a frame shape so as to surround the display region 41. Then, a color material 33 formed of the pigment or the dye is formed to fill up the space in the black matrix 32. The color materials 33 are, for example, a color filter of R (red), G (green), and B (blue), for example.

Further, an opposing electrode 34 is formed to cover the black matrix 32 and the color material 33. The electric filed is generated between the opposing electrode 34 and the pixel electrode 19 of the TFT array substrate 10, and the opposing electrode 34 drives the liquid crystal of the liquid crystal layer 36. Note that a protection film formed of SiN or the like may be provided between the color material 33 and the opposing electrode 34. The protection film is formed on the whole surface of the substrate 31 of the opposing substrate 30, as is similar to the opposing electrode 34. On the opposing electrode 34, columnar spacers 35 are provided. The columnar spacers 35 are provided in the display region 41 and the frame region 42 in a space surrounded by the TFT array substrate 10, the opposing substrate 30, and the sealing material 37, and hold the gap between the both substrates. The columnar spacer 35 provided in the display region 41 is provided in a part that is opposed to the reflective pixel electrode 192. The columnar spacer 35 provided in the frame region 42 is provided in a part that is opposed to the gap retaining pad 20. The columnar spacer 35 is formed of a material such as a resin or the like, and has a columnar shape. The columnar spacer 35 in the display region 41 is formed to have the same height as that in the frame region 42.

In the liquid crystal display panel 1 according to the first embodiment formed as above, the distance between the surface of the TFT array substrate 10 and the surface of the opposing substrate 30 that are opposed to each other in the gap retaining pad 20 is substantially equal to that in the pixel region. Accordingly, by providing the columnar spacer 35 in a position that is opposed to the gap retaining pad 20, the gap between the both substrates can be kept equal as that in the display region 41, and the gap between the both substrates can be kept even across the whole part of the liquid crystal display panel 1. As such, the gap retaining pad 20 has a function of adjusting the substrate gap outside the display region according to the substrate gap on the pixel electrode 19 in the liquid crystal display panel 1.

Next, a manufacturing method of the liquid crystal display device according to the first embodiment will be described with reference to FIGS. 6A to 6H. FIGS. 6A to 6H are cross sectional views showing the manufacturing process of the TFT array substrate 10 according to the first embodiment. In each of FIGS. 6A to 6H, the right side shows a cross sectional view in the pixel 49 corresponding to the cross section of Further, in each of FIGS. 6A to 6H, the left side shows a cross sectional view of the gate terminal 44 portion, the source terminal 43 portion, and the gap retaining pad 20 portion.

First, an electrode film to serve as the gate electrode 121 or the like is formed on the substrate 11 formed of the transparent insulating substrate such as the glass. For example, Mo having a film thickness of 250 nm is formed on the whole surface of the substrate 11 using a sputtering device or the like. Next, a resist pattern is formed on the electrode film by a photolithography process. Then, the electrode film that is exposed from the resist pattern is removed by a wet etching process or the like to pattern the electrode film. Then, a resist removing process is performed to remove the resist pattern, to thereby forming the gate line 12, the gate electrode 121, the auxiliary capacitance electrode 122, and the gate terminal 44 as shown in FIG. 6A.

The gate insulating film 13 is formed so as to cover the gate line 12, the gate electrode 121, the auxiliary capacitance electrode 122, and the gate terminal 44. For example, SiN having a film thickness of 400 nm is formed on the whole surface of the substrate 11 as the gate insulating film 13 using a CVD device. Subsequently, the semiconductor layer 14 and the ohmic contact film 15 are formed in this order on the gate insulating film 13. For example, a-Si (i) having a film thickness of 130 nm is formed on the whole surface of the substrate 11 as the semiconductor layer 14 using a CVD device. Then, a-Si (n) having a film thickness of 50 nm to which impurities such as phosphorus (P) or the like is added is formed on the whole surface of the substrate 11 as the ohmic contact film 15.

After that, the resist pattern is formed on the ohmic contact film 15 by the photolithography process. Then, the ohmic contact film 15 and the semiconductor layer 14 are patterned to have an island shape by dry etching or the like. When the resist pattern is removed, the semiconductor layer 14 and the ohmic contact film 15 are formed in the opposite surface of the gate electrode 121 with the gate insulating film 13 interposed therebetween, as shown in FIG. 6B. Note that, as shown in FIG. 6B, a stacked pattern of the semiconductor layer 14 and the ohmic contact film 15 may be formed on the region of the gate line 12 to be the intersection with the source line 16.

Next, the electrode film to serve as the source electrode 161, the drain electrode 162 or the like is formed to cover the semiconductor layer 14 and the ohmic contact film 15. For example, Mo having a film thickness of 300 nm is formed on the whole surface of the substrate 11 using the sputtering device or the like. Next, the resist pattern is formed on the electrode film by the photolithography process. Then, the electrode film is patterned by wet etching or the like. As such, the source line 16, the source electrode 161, the drain electrode 162, and the source terminal 43 are formed. Subsequently, the ohmic contact film 15 that is exposed on the surface without being covered with the source electrode 161 or the drain electrode 162 is removed by the dry etching or the like. Thus, the semiconductor layer 14 between the source electrode 161 and the drain electrode 162 is exposed to form the channel region. After that, the resist removing process is performed to remove the resist pattern, whereby the structure shown in FIG. 6C can be obtained.

Next, the interlayer insulating film 17 is formed to cover the source line 16, the source electrode 161, the drain electrode 162, and the source terminal 43. For example, SiN having a film thickness of 100 nm is formed on the whole surface of the substrate 11 as the interlayer insulating film 17 using the CVD device. Subsequently, the organic film 18 having photosensitivity is applied on the interlayer insulating film 17 so that a film thickness of the flat part of the organic film 18 is about 3600 nm. After that, the photolithography process is performed to pattern the organic film 18. Thus, the organic film 18 on the drain electrode 162, the gate terminal 44, and the source terminal 43 is removed to form openings, and the concave and convex pattern 185 is formed in the organic film 18 of the reflective region.

Then, the interlayer insulating film 17 and the gate insulating film 13 are patterned by the dry etching or the like using the organic film 18 as a mask. As such, as shown in FIG. 6D, the interlayer insulating film 17 over the drain electrode 162 is removed to form the contact hole 181 that reaches the drain electrode 162. Further, the interlayer insulating film 17 over the source terminal 43 is removed to form the contact hole 182 that reaches the source terminal 43. Further, the gate insulating film 13 and the interlayer insulating film 17 over the gate terminal 44 are removed to form the contact hole 183 that reaches the gate terminal 44.

Next, the transparent conductive layer 191d to serve as the transmissive pixel electrode 191 and the reflective metal layer 192d to serve as the reflective pixel electrode 192 are successively formed on the organic film 18. For example, ITO having a film thickness of 80 nm is formed over the whole surface of the substrate 11 as the transparent conductive layer 191d using the sputtering device. IZO, ITZO, ITSO or the like may also be used instead of ITO in the transparent conductive layer 191d. Then, Mo having a film thickness of 50 nm, and AlCu having a film thickness of 300 nm are formed over the whole surface of the substrate 11 in this order as the reflective metal layer. In this example, ITO having a film thickness of 5 nm is successively formed over the whole surface of the substrate 11 as the upper transparent conductive layer 193. Note that IZO, ITZO, ITSO or the like may also be used instead of ITO as the upper transparent conductive layer 193. As such, as shown in FIG. 6E, the contact holes 181, 182, 183 are covered with the transparent conductive layer 191*d*, the reflective metal layer 192*d*, and the upper transparent conductive layer 193.

Subsequently, after applying the resist on the upper transparent conductive layer 193 by a spin coating or the like, the resist pattern 25 having a difference in film thickness is formed by the photolithography process using a multiple tone exposure such as a halftone. In the pixel region, the resist pattern 25 is formed so that the film thickness of the transmissive pixel electrode portion is thinner than the film thickness of the reflective pixel electrode portion. In summary, the resist pattern 25 includes a thick film portion 25*a* in the reflective pixel electrode portion of the pixel 49 and a thin film portion 25*b* in the transmissive pixel electrode portion of the pixel 49. At this time, in the first embodiment, the resist pattern 25 is formed including the thick film portion 25*a* formed in the gate terminal portion and the source terminal portion and the thin film portion 25*b* formed in the gap retaining pad portion.

Figure 6F:
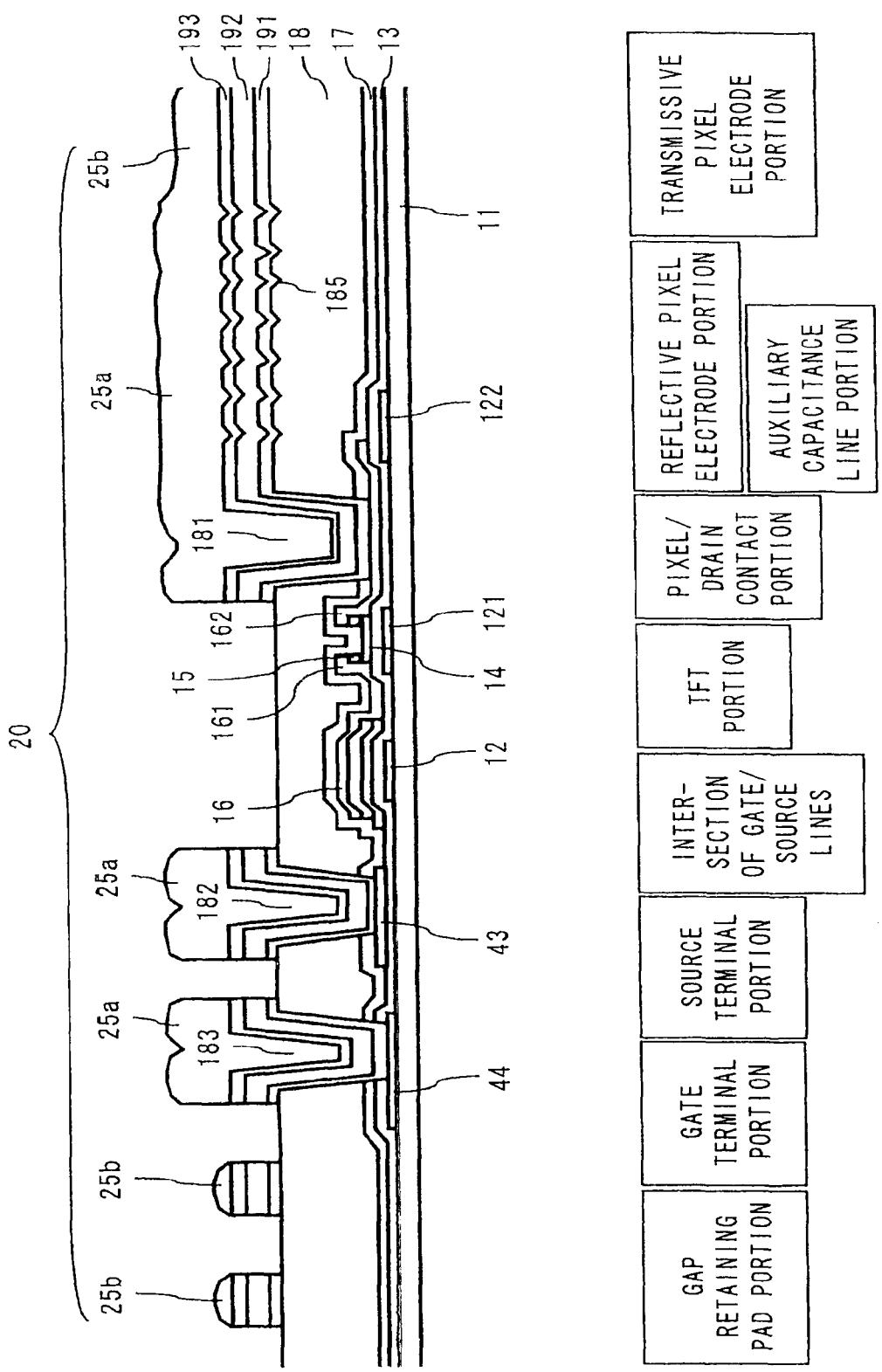

Then, the upper transparent conductive layer 193, the reflective metal layer 192*d*, and the transparent conductive layer 191*d* are patterned successively or at one time by the wet etching using the resist pattern 25 as a mask. As such, the upper transparent conductive layer 193, the reflective metal layer 192*d*, and the transparent conductive layer 191*d* are removed in the region that is not covered with the resist pattern 25 to expose the organic film 18, as shown in FIG. 6F.

Next, the thin film portion 25*b* of the resist pattern 25 is removed by ashing. The thickness of the thick film portion 25*a* of the resist pattern 25 is decreased, and the thick film portion 25*a* remains as a resist pattern 25*c*. In short, as shown in FIG. 6G, the resist pattern 25 where the thin film portion 25*b* is removed becomes the resist pattern 25*c*. As such, the resist pattern 25 on the gap retaining pattern portion is removed. Further, the organic film 18 of the portion exposed from the upper transparent conductive layer 193, the reflective metal layer 192*d*, and the transparent conductive layer 191*d* becomes thinner due to the ashing, and the thin film portion is formed in the organic film 18. At this time, in the first embodiment, as the organic film 18 of the gap retaining pad portion is covered with the upper transparent conductive layer 193, the reflective metal layer 192*d*, and the transparent conductive layer 191*d*, the thickness of the organic film 18 is not decreased. As such, the organic film 18 having the thick film portion that is similar to that in the pixel region is formed in the gap retaining pad portion.

After the ashing is performed, the wet etching is performed using the resist pattern 25*c* as a mask, so as to selectively pattern the upper transparent conductive layer 193 and the reflective metal layer 192*d*. As such, the upper transparent conductive layer 193 and the reflective metal layer 192*d* in the transmissive pixel electrode portion and the gap retaining pad portion are removed, and the transparent conductive layer 191*d* is exposed. After that, the resist pattern 25*c* is removed using a resist removing solution. As such, as shown in FIG. 6H, the pixel electrode 19 having the reflective pixel electrode 192 and the upper transparent conductive layer 193 stacked in a part of the transmissive pixel electrode 191 is formed. Further, the source terminal pad and the gate terminal pad that are connected to the source terminal 43 and the gate terminal 44 through the contact holes 182 and 183 respectively are formed of a stacked film of the transparent conductive layer 191*d*, the reflective metal layer 192*d*, and the upper transparent conductive layer 193. Further, the gap retaining pad 20 having the transparent conductive layer 191*d* stacked on the thick film portion of the organic film 18 is formed.

By patterning the upper transparent conductive layer 193 and the reflective metal layer 192*d* by the above method, the pixel electrode 19 is formed to have a step shape so that the pattern ends of the upper transparent conductive layer 193 and the reflective pixel electrode 192 are inside the pattern end of the transmissive pixel electrode 191. In summary, the reflective pixel electrode 192 is prevented from being out of the transmissive pixel electrode 191 to have a protrusion shape (overhang shape). Accordingly, it is possible to prevent the occurrence of the failure in the later process that may be caused due to the pixel electrode 19 having the protrusion shape. The TFT array substrate 10 according to the first embodiment is thus completed.

An orientation film is formed on the TFT array substrate 10 thus manufactured by a transfer method or the like. Next, the orientation film is heated and cured, followed by orientation processing (rubbing process) on the orientation film. In the orientation processing, micro scratches are formed on a contact surface with the liquid crystal layer 36.

On the other hand, the black matrix 32 is formed on another substrate 31 by the photolithography process. The black matrix 32 may be formed of a metal such as chrome or a resin including pigment. Then, the color materials 33 are formed on the black matrix 32 by the photolithography process so as to fill the space between the black matrix 32. The color material 33 may be a photosensitive resin formed of the pigment or the dye. In this example, the protection film such as SiN is formed on substantially the whole surface of the substrate 31 so as to cover the black matrix 32 and the color materials 33. On this protection film, the opposing electrode 34 is formed over substantially the whole surface of the substrate 31. A transparent conductive film formed of ITO or the like is used as the opposing electrode 34.

On the opposing substrate 30 where the opposing electrode 34 is thus provided, the orientation film is formed in a similar way as in the TFT array substrate 10, followed by the rubbing process. Then, the photoresist (photosensitive resin) to serve as the columnar spacer 35 is applied on the orientation film. Then, the photoresist is patterned by the photolithography process to form the columnar spacer 35. At this time, the columnar spacers 35 are formed in a position that is opposed to the reflective pixel electrode 192 and in a position that is opposed to the gap retaining pad 20 of the TFT array substrate 10 in the later process of bonding the substrates. The opposing substrate 30 having the columnar spacer 35 is thus formed.

Next, the sealing material 37 is applied to bond the TFT array substrate 10 with the opposing substrate 30 (substrate bonding process). At this time, the TFT array substrate 10 and the opposing substrate 30 are bonded together in a way that the columnar spacers 35 are arranged to be opposed to the reflective pixel electrode 192 and the gap retaining pad 20. After bonding the TFT array substrate 10 with the opposing substrate 30, liquid crystal is filled from a liquid crystal injection port by a vacuum injection method or the like (liquid crystal filling process). Then, the liquid crystal injection port is sealed (sealing process). As such, the liquid crystal display panel 1 according to the first embodiment is completed.

As stated above, according to the first embodiment, the columnar spacers 35 of the opposing substrate 30 are arranged to be opposed to the gap retaining pad 20 and the reflective pixel electrode 192 of the TFT array substrate 10 to retain the gap between the both substrates. Accordingly, even when the pressure is applied between the TFT array substrate 10 and the opposing substrate 30 in the substrate bonding process, the liquid crystal filling process, and the sealing process, the gap between the both substrates can be kept even across the whole part of the liquid crystal display panel 1.

After that, the polarizing plate is bonded to the external part of the TFT array substrate 10 and the opposing substrate 30. Then, the control substrate is mounted, and the backlight unit or the like is attached. The liquid crystal display device according to the first embodiment is thus completed.

As stated above, according to the first embodiment, the transparent conductive layer 191d which is in the same layer as the transmissive pixel electrode 191 is provided in a region outside the display region 41 and inside the sealing material 37 on the TFT array substrate 10, so as to form the gap retaining pad 20. Accordingly, the thick film portion of the organic film 18 is formed below the transparent conductive layer 191d in a similar way as a position below the reflective pixel electrode 192. Then, the both substrates are bonded together so that the columnar spacers 35 of the opposing substrate 30 are arranged in the opposite surface of the gap retaining pad 20 and the reflective pixel electrode 192. As such, the distance with the surface of the opposing substrate 30 on the gap retaining pad 20 is substantially equal to that on the reflective pixel electrode 192, and the columnar spacers 35 retain the gap between the both substrates in these parts. Accordingly, the gap between the both substrates outside the display region 41 is equal to that inside the display region 41. Accordingly, the display unevenness that is produced at the periphery of the display region 41 can be suppressed, and the liquid crystal display device having excellent display quality can be provided.

Figure 7:
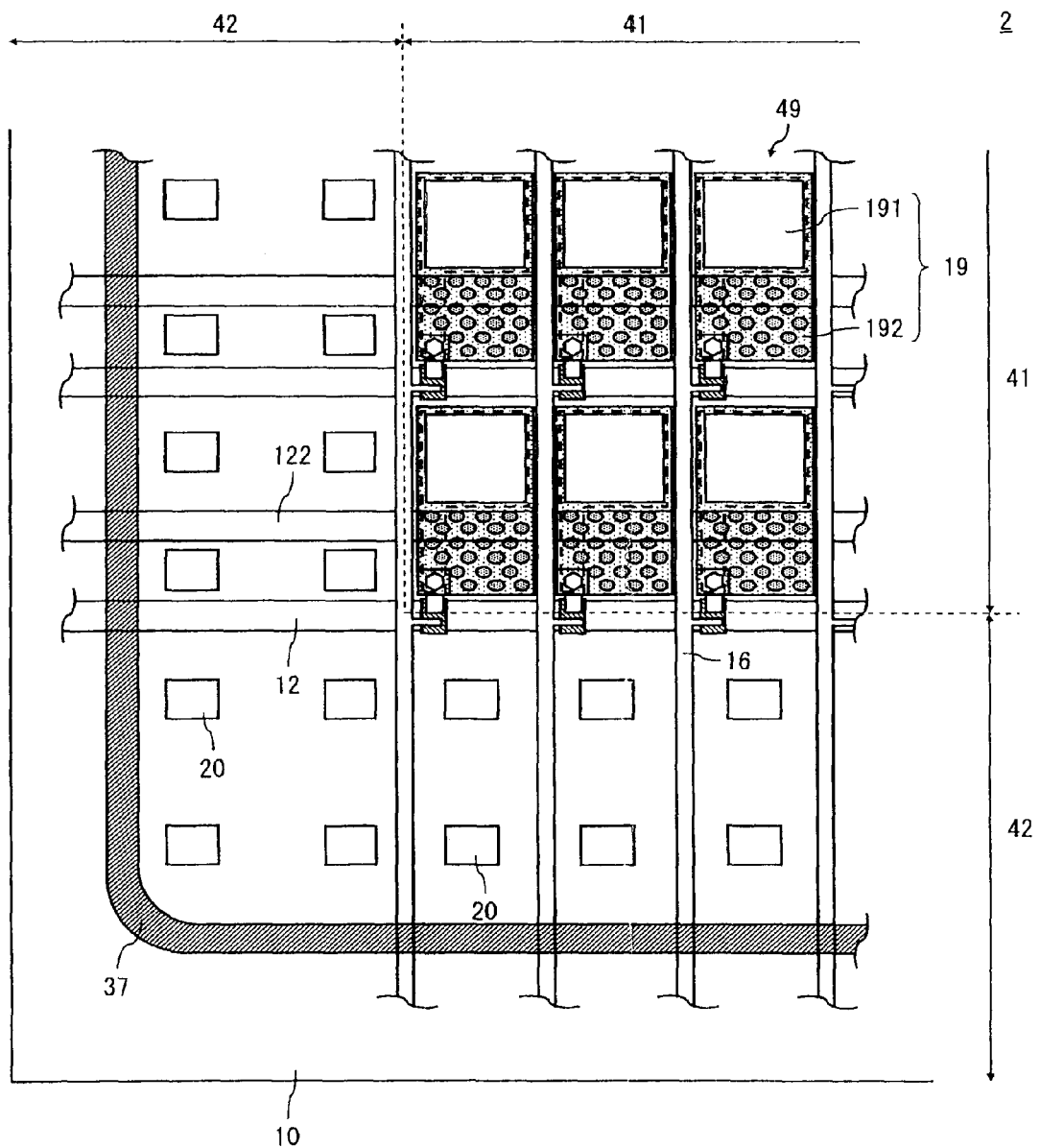
FIG. 7 is an enlarged plane view showing the structure at the periphery of the display region and outside thereof of a liquid crystal display panel according to another exemplary example of the first embodiment.
Figure 8:
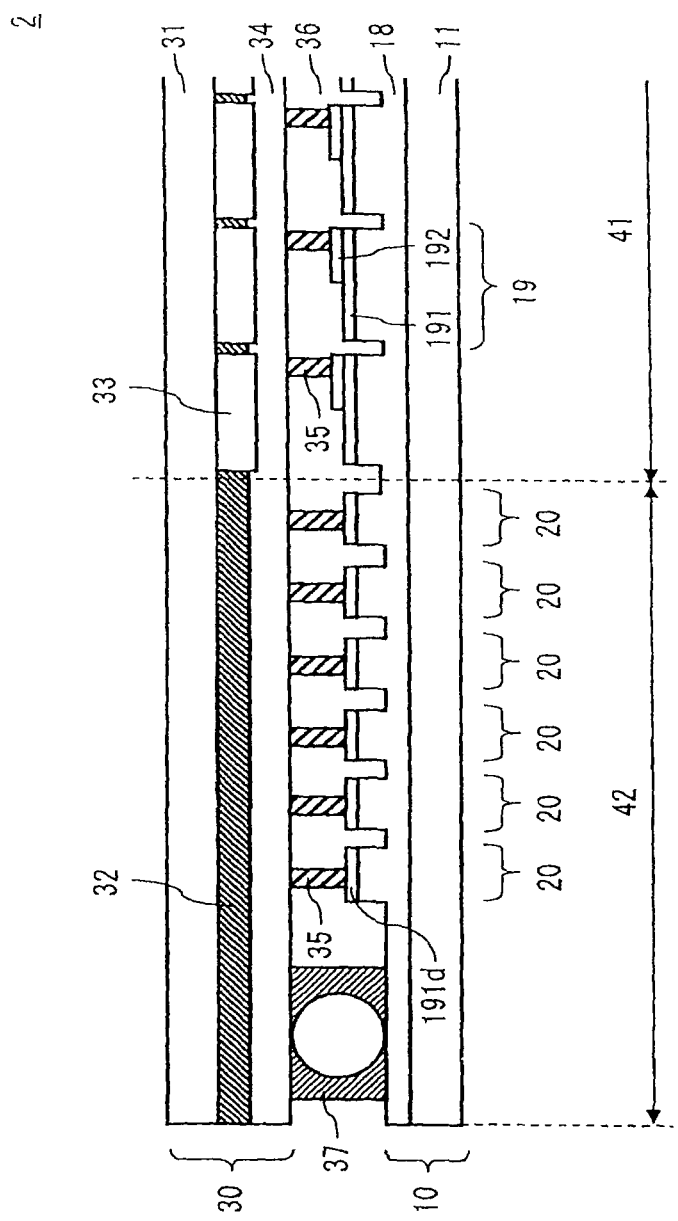
FIG. 8 is a cross sectional view schematically showing the structure at the periphery of the display region and outside thereof of the liquid crystal display panel according to another exemplary example of the first embodiment.

In the description above, the gap retaining pads 20 are formed to have the strip shape along each side of the sealing material 37, and the plurality of columnar spacers 35 are arranged opposite to one gap retaining pad 20. However, the shape of the gap retaining pad 20 is not limited to it. FIG. 7 is an enlarged plane view showing the structure at the periphery of the display region 41 and outside thereof of a liquid crystal display panel 2 according to another exemplary example of the first embodiment. Further, FIG. 8 is a cross sectional view schematically showing the structure at the periphery of the display region 41 and outside thereof of the liquid crystal display panel 2 according to another exemplary example of the first embodiment. In FIG. 7, only the structure of the TFT array substrate 10 side is shown, and the structure of the opposing substrate 30 side is omitted. Further, in FIG. 8, the structure of the TFT array substrate 10 is schematically shown. For example, as shown in FIGS. 7 and 8, the gap retaining pad 20 may be formed to have a size which is able to include the columnar spacer 35, and each of the columnar spacers 35 may be arranged opposite to one gap retaining pad 20.

Second Embodiment

Figure 9:
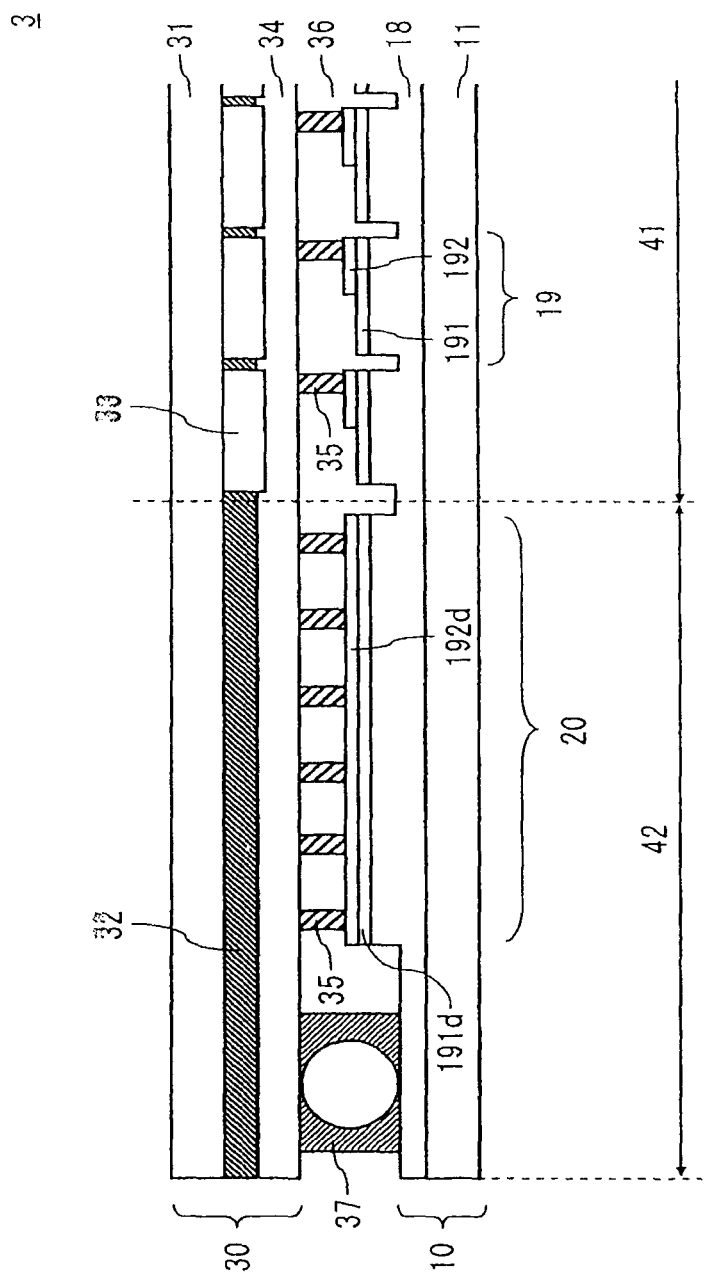
FIG. 9 is a cross sectional view schematically showing the structure at the periphery of a display region and outside thereof of a liquid crystal display panel according to a second embodiment.

A liquid crystal display device according to the second embodiment will be described with reference to FIG. 9. The basic structure of the liquid crystal display device according to the second embodiment is similar to that of the first embodiment, and thus, the overlapping description will be omitted. In the second embodiment, the structure of the gap retaining pad 20 is different from that of the first embodiment. FIG. 9 is a cross sectional view schematically showing the structure at the periphery of the display region 41 and outside thereof of a liquid crystal display panel 3 according to the second embodiment. In FIG. 9, the cross section corresponding to the cross sectional view in FIG. 4 is shown.

In FIG. 9, the components identical to those in FIG. 5 are denoted by the same reference symbols, and only the difference will be described. As shown in FIG. 9, as is similar to the first embodiment, the gap retaining pad 20 is provided in a region outside the display region 41 and inside the sealing material 37 on the TFT array substrate 10. In the second embodiment, the gap retaining pad 20 includes the transparent conductive layer 191d formed in the same layer as the transmissive pixel electrode 191 and the reflective metal layer 192d formed in the same layer as the reflective pixel electrode 192 which are stacked on the thick film portion of the organic film 18. Note that, when the pixel electrode 19 includes the upper transparent conductive layer 193 for adjusting the work function on the reflective pixel electrode 192, the gap retaining pad 20 further includes the upper transparent conductive layer 193 stacked on the reflective metal layer 192d.

Then, the TFT array substrate 10 and the opposing substrate 30 are bonded together through the sealing material 37 so that the columnar spacers 35 of the opposing substrate 30 are arranged to be opposed to the gap retaining pad 20 and the reflective pixel electrode 192 of the TFT array substrate 10.

Next, the manufacturing method of the liquid crystal display device according to the second embodiment will be described with reference to FIGS. 10A to 10H. FIGS. 10A to 10H are cross sectional views showing the manufacturing process of the TFT array substrate 10 according to the second embodiment of the present invention. In each of FIGS. 10A to 10H, the right side shows a cross sectional view in the pixel 49 corresponding to the cross section of III-III of FIG. 2, as is similar to FIGS. 6A to 6H. Further, in each of FIGS. 10A to 10H, the left side shows a cross sectional view of the gate terminal 44 portion, the source terminal 43 portion, and the gap retaining pad 20 portion. In the second embodiment, the forming process of the gap retaining pad 20 is different from that of the first embodiment. The other processes are identical to those of the first embodiment, and thus the description will be omitted.

As is similar to the first embodiment, the electrode film to serve as the gate electrode 121 is firstly formed on the whole surface of the substrate 11. This electrode film is patterned by the photolithography, the etching, and the resist removal. As such, the gate line 12, the gate electrode 121, the auxiliary capacitance electrode 122, and the gate terminal 44 are formed on the substrate 11, and the structure shown in FIG. 10A is obtained. Then, the gate insulating film 13, the semiconductor layer 14, and the ohmic contact film 15 are formed to cover them. After that, the semiconductor layer 14 and the ohmic contact film 15 are patterned by the photolithography process, and the structure shown in FIG. 10B is obtained.

Next, the electrode film that covers them is formed in the same way as in the first embodiment. Then, the source line 16, the source electrode 161, the drain electrode 162, and the source terminal 43 are formed by the photolithography and the etching. Subsequently, as is similar to the first embodiment, the ohmic contact film 15 between the source electrode 161 and the drain electrode 162 is removed by etching, so as to form the channel region. After that, the resist removing process is performed to obtain the structure shown in FIG. 10C.

After forming the channel region, as is similar to the first embodiment, the interlayer insulating film 17 is formed thereon. Subsequently, the organic film 18 having the concave and convex pattern 185 and the opening is formed on the interlayer insulating film 17 by the photolithography process.

Then, the etching is performed using the organic film 18 as a mask. As such, as shown in FIG. 10D, the contact hole 181 that reaches the drain electrode 162, the contact hole 183 that reaches the gate terminal 44, and the contact hole 182 that reaches the source terminal 43 are formed.

Then, as is similar to the first embodiment, the transparent conductive layer 191d and the reflective metal layer 192d are successively formed on the organic film 18. As is similar to the first embodiment, the upper transparent conductive layer 193 is further formed on the reflective metal layer 192d in the second embodiment as well. Thus, as shown in FIG. 10E, the contact holes 181, 182, 183 are covered with the transparent conductive layer 191d, the reflective metal layer 192d, and the upper transparent conductive layer 193.

Figure 10F:
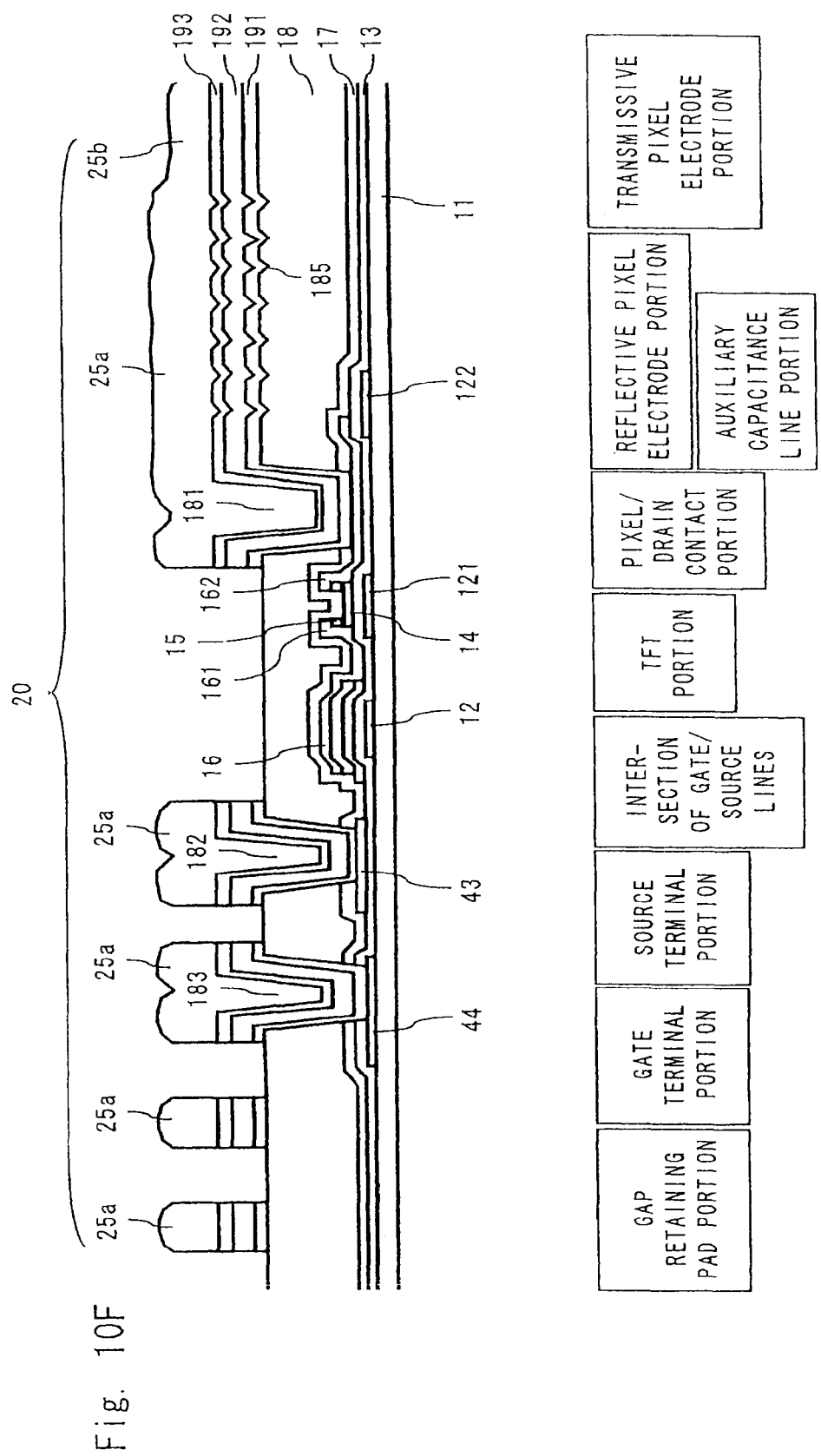

Subsequently, after applying the resist on the upper transparent conductive layer 193 by the spin coating or the like, the resist pattern 25 having a difference in film thickness is formed by the photolithography process using the multiple tone exposure such as the halftone. In the second embodiment, as shown in FIG. 10F, the thick film portion 25a of the resist pattern 25 is formed in the reflective pixel electrode portion, the gate terminal portion, the source terminal portion, and the gap retaining pad portion. Further, the thin film portion 25b of the resist pattern 25 is formed in the transmissive pixel electrode portion. In summary, although the thin film portion 25b is formed in the gap retaining pad portion in the first embodiment, the thick film portion 25a is formed in the gap retaining pad portion in the second embodiment.

Then, the upper transparent conductive layer 193, the reflective metal layer 192d, and the transparent conductive layer 191d are patterned successively or at one time using the resist pattern 25 as a mask by the wet etching or the like. As such, as shown in FIG. 10F, the upper transparent conductive layer 193, the reflective metal layer 192d, and the transparent conductive layer 191d of the region which is not covered with the resist pattern 25 are removed to expose the organic film 18.

Next, the thin film portion 25b of the resist pattern 25 is removed by the ashing. The resist pattern 25 where the thin film portion 25b is removed becomes, as shown in FIG. 10G, the resist pattern 25c. As such, the thickness of the thick film portion 25a of the resist pattern on the gap retaining pattern portion is made thinner, and the thick film portion 25a remains as the resist pattern 25c. Further, the thickness of the organic film 18 of the part that is exposed from the upper transparent conductive layer 193, the reflective metal layer 192d, and the transparent conductive layer 191d is decreased as well by the ashing, and the thin film portion is formed in the organic film 18. At this time, in the second embodiment, the organic film 18 of the gap retaining pad portion is covered with the upper transparent conductive layer 193, the reflective metal layer 192d, and the transparent conductive layer 191d. Thus, the thickness of the organic film 18 is not deceased. As such, the organic film 18 including the thick film portion which is similar to that in the pixel region is formed in the gap retaining pad portion.

After the ashing, the wet etching or the like is performed using the resist pattern 25c as a mask, and the upper transparent conductive layer 193 and the reflective metal layer 192d are selectively patterned. As such, the reflective metal layer 192d and the upper transparent conductive layer 193 of the transmissive pixel electrode portion are removed to expose the transparent conductive layer 191d. After that, the resist pattern 25c is removed using the resist removing solution. As such, as shown in FIG. 10H, the pixel electrode 19 where the reflective pixel electrode 192 and the upper transparent conductive layer 193 are stacked on a part of the transmissive pixel electrode 191 is formed. Further, the source terminal pad and the gate terminal pad that are connected to the source terminal 43 and the gate terminal 44 through the contact holes 182 and 183 respectively are formed of a stacked film of the transparent conductive layer 191d, the reflective metal layer 192d, and the upper transparent conductive layer 193. Further, the gap retaining pad 20 is formed where the transparent conductive layer 191d, the reflective metal layer 192d, and the upper transparent conductive layer 193 are stacked on the thick film portion of the organic film 18.

The TFT array substrate 10 according to the second embodiment is thus completed. The following process is similar to that of the first embodiment, and thus, the description will be omitted.

As stated above, according to the second embodiment, a conductive layer that is the same as the conductive layer that forms the pixel electrode 19 is provided on the TFT array substrate 10 in a region outside the display region 41 and inside the sealing material 37 to form the gap retaining pad 20. Accordingly, the thick film portion of the organic film 18 is formed below the conductive layer of the gap retaining pad 20 in a similar way as below the reflective pixel electrode 192. Then, the both substrates are bonded together so that the columnar spacers 35 of the opposing substrate 30 is arranged opposite to the gap retaining pad 20 and the reflective pixel electrode 192. As such, the distance with the surface of the opposing substrate 30 on the gap retaining pad 20 is substantially equal to that on the reflective pixel electrode 192, and the columnar spacers 35 retain the gap between the both substrates in these parts. Accordingly, the gap between the both substrates outside the display region 41 is equal to that inside the display region 41. Accordingly, the display unevenness that is produced at the periphery of the display region 41 can be suppressed, and the liquid crystal display device having excellent display quality can be provided.

Third Embodiment

Figure 11:
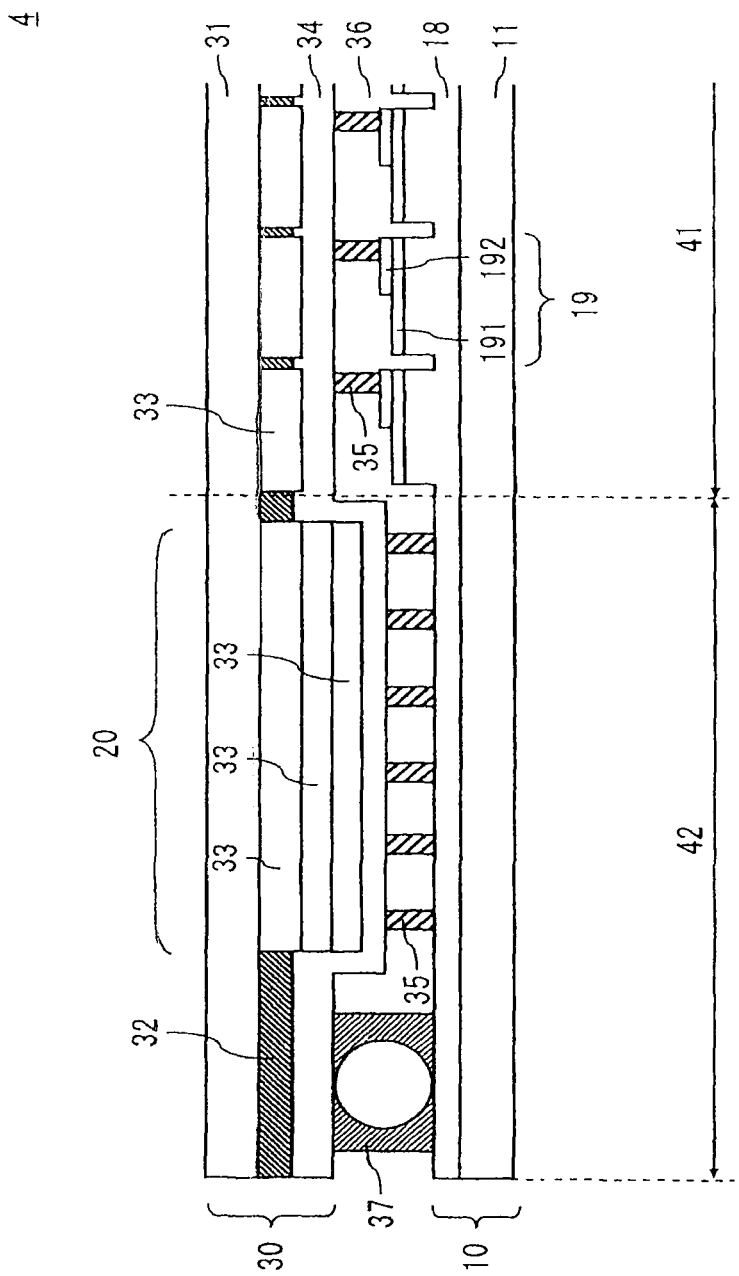
FIG. 11 is a cross sectional view schematically showing the structure at the periphery of a display region and outside thereof of a liquid crystal display panel according to a third embodiment.

A liquid crystal display device according to the third embodiment will be described with reference to FIG. 11. As the basic structure of the liquid crystal display device according to the third embodiment is similar to that of the first embodiment, the overlapping description will be omitted. In the third embodiment, the structure of the gap retaining pad 20 is different from that of the first and second embodiments. FIG. 11 is a cross sectional view schematically showing the structure at the periphery of the display region 41 and outside thereof of a liquid crystal display panel 4 according to the third embodiment.

In FIG. 11, the components identical to those of FIG. 5 are denoted by the same reference symbols, and the difference will be described. In the third embodiment, as shown in FIG. 11, the gap retaining pad 20 is provided in a region outside the display region 41 and inside the sealing material 37 on the opposing substrate 30. In summary, the gap retaining pad 20 is provided in the opposing substrate 30 side instead of being provided in the TFT array substrate 10 side. Accordingly, as is similar to the related example shown in FIG. 17, in the outside of the display region 41 of the TFT array substrate 10, the thin film portion of the organic film 18 that is similar to the region between pixels is formed.

In the gap retaining pad 20, a plurality of color materials 33 are stacked on the substrate 31, and the opposing electrode 34 is formed to cover them. Although the color materials 33 of red (R), green (G), and blue (B) are stacked in the gap retaining pad 20 in this example, the number of color materials 33 that are stacked is determined as needed depending on the distance between the surface of the gap retaining pad 20 of the opposing substrate 30 and the surface of the opposing TFT array substrate 10. In summary, the color materials 33 that are stacked on the gap retaining pad 20 is determined so that the distance between the surfaces of the TFT array substrate 10 and the opposing substrate 30 that are opposed to each other on the gap retaining pad 20 of the opposing substrate 30 is equal to that on the reflective pixel electrode 192 of the TFT array substrate 10.

The shape of the gap retaining pad 20 is not particularly limited as is similar to the first embodiment. For example, as described in the first embodiment, the gap retaining pads 20 are formed to have the strip shape along each side of the sealing material 37, and the plurality of columnar spacers 35 may be provided on one gap retaining pad 20. Further, the gap retaining pad 20 may be formed to have a size which is able to include the columnar spacer 35, and each of the columnar spacers 35 may be provided in one gap retaining pad 20. Note that, when the protection film is provided between the color materials 33 and the opposing electrode 34 in the display region 41, the protection film is also formed in the gap retaining pad 20 by extending it from the display region 41.

On the opposing electrode 34 of the opposing substrate 30 where the gap retaining pad 20 is provided as stated above, the columnar spacers 35 are provided in a position that is opposed to the reflective pixel electrode 192 and in a position on the gap retaining pad 20. Then, the TFT array substrate 10 and the opposing substrate 30 are bonded together through the sealing material 37 so that the columnar spacers 35 of the opposing substrate 30 are arranged to be opposed to the reflective pixel electrode 192 of the TFT array substrate 10 and to the region which is outside the display region 41 and inside the sealing material 37.

Figure 12:
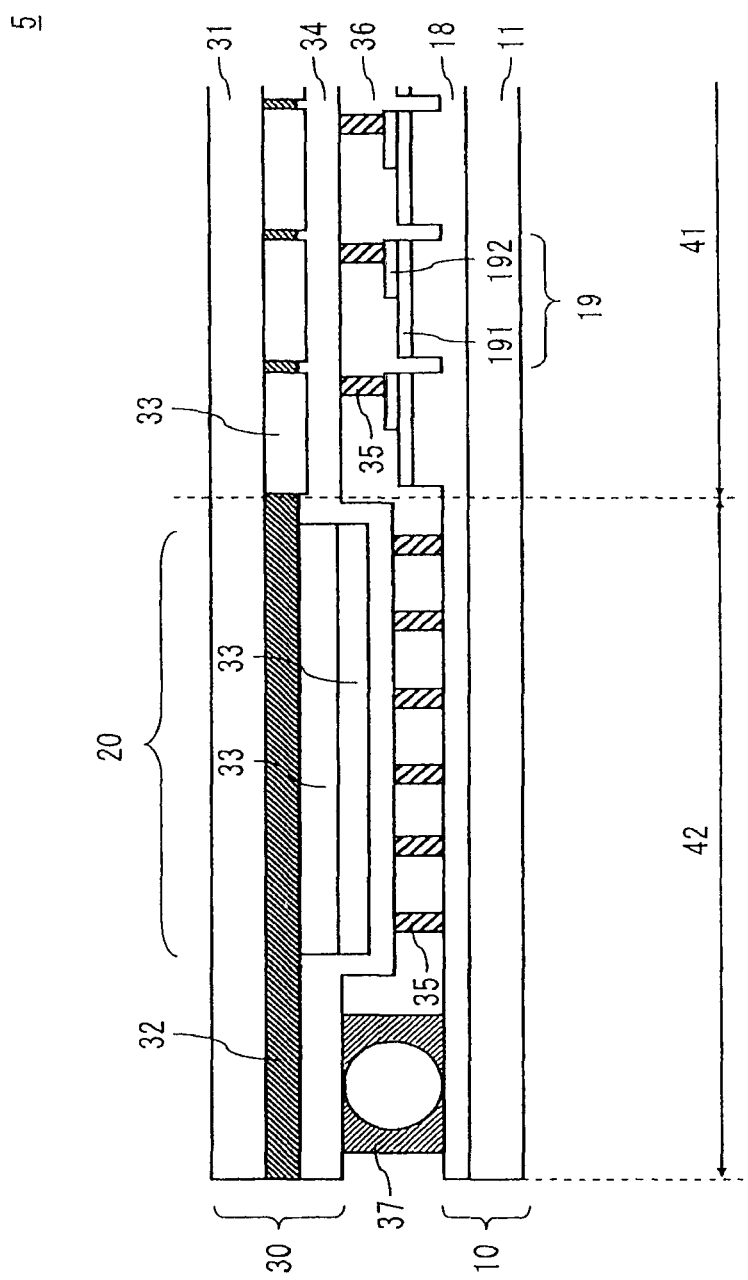
FIG. 12 is a cross sectional view schematically showing the structure at the periphery of the display region and outside thereof of a liquid crystal display panel according to another exemplary example of the third embodiment.

Note that the gap retaining pad 20 is not limited to the above structure. FIG. 12 is a cross sectional view schematically showing the structure at the periphery of the display region 41 and outside thereof of a liquid crystal display panel 5 according to another exemplary example of the third embodiment. As shown in FIG. 12, the black matrix 32 may be formed between the color materials 33 and the substrate 31 in the gap retaining pad 20. In this example, in the gap retaining pad 20, the two color materials 33 are stacked on the black matrix 32. However, as stated above, the number of color materials 33 that are stacked is determined as appropriate according to the distance between the surface of the gap retaining pad 20 of the opposing substrate 30 and the surface of the opposing TFT array substrate 10.

As described above, in the third embodiment, at least two layers which are selected from the color materials 33 and the black matrix 32 are stacked in the region outside the display region 41 and inside the sealing material 37 on the opposing substrate, so as to form the gap retaining pad 20. Accordingly, the height of the opposing substrate 30 from the surface of the substrate 31 in the gap retaining pad 20 becomes higher than that in the display region 41. In other words, the distance from the surface of the TFT array substrate 10 on the gap retaining pad 20 is substantially equal to the distance from the surface of the opposing substrate 30 on the reflective pixel electrode 192, and the distance between the both substrates is held by the columnar spacers 35 in these parts. Accordingly, the distance between the both substrates outside the display region 41 is equal to that inside the display region 41. Accordingly, it is possible to provide the liquid crystal display device with high display quality and which suppresses the display unevenness that occurs at the periphery of the display region 41.

Fourth Embodiment

Figure 13:
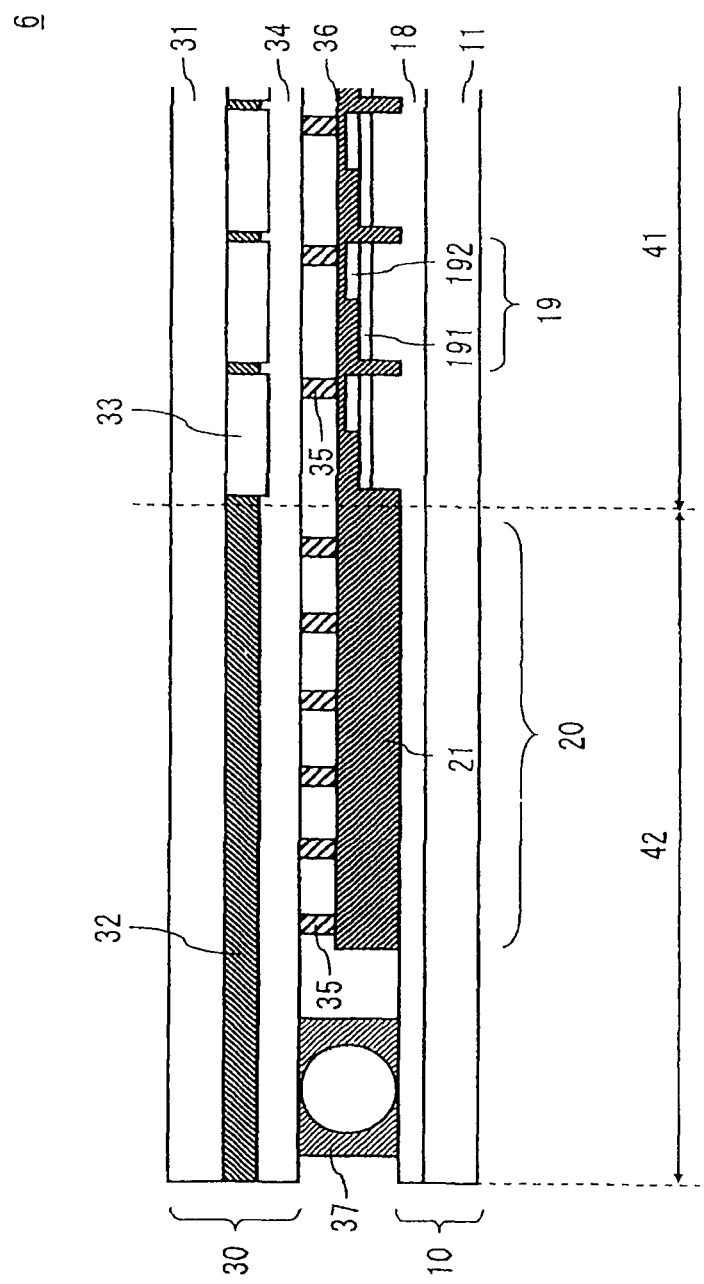
FIG. 13 is a cross sectional view schematically showing the structure at the periphery of a display region and outside thereof of a liquid crystal display panel according to a fourth embodiment.

A liquid crystal display device according to the fourth embodiment will be described with reference to FIG. 13. As the basic structure of the liquid crystal display device according to the fourth embodiment is similar to that of the first embodiment, the overlapping description will be omitted. In the fourth embodiment, the structure of the TFT array substrate 10 is different from that of the first embodiment. FIG. 13 is a cross sectional view schematically showing the structure at the periphery of the display region 41 and outside thereof of a liquid crystal display panel 6 according to the fourth embodiment.

In FIG. 13, the same components as those in FIG. 5 are denoted by identical reference symbols, and only the difference will be described. As shown in FIG. 13, the thin film portion of the organic film 18 as is similar to the region between pixels is formed outside the display region 41 of the TFT array substrate 10, as is similar to the related example shown in FIG. 17. In the fourth embodiment, a planarizing film 21 is further formed on the pixel electrode 19 of the TFT array substrate 10. The planarizing film 21 is formed to cover the pixel electrode 19 and the organic film 18, and planarizes the irregularities that are produced on the TFT array substrate 10. The planarizing film 21 is formed to be larger than the display region 41 and formed in the region inside the sealing material 37 having the frame shape. In other words, the planarizing film 21 is not provided below the sealing material 37. As stated above, the planarizing film 21 functions as the gap retaining pad 20 in the region outside the display region 41 and inside the sealing material 37 as is similar to the first embodiment. The planarizing film 21 is formed of a planarizing film such as an organic insulating film or an inorganic insulating film.

The TFT array substrate 10 where the planarizing film 21 is thus provided is bonded to the opposing substrate 30 through the sealing material 37 so that the columnar spacer 35 of the opposing substrate 30 is arranged to be opposed to the reflective pixel electrode 192 and to the region outside the display region 41 and inside the sealing material 37.

Figure 14:
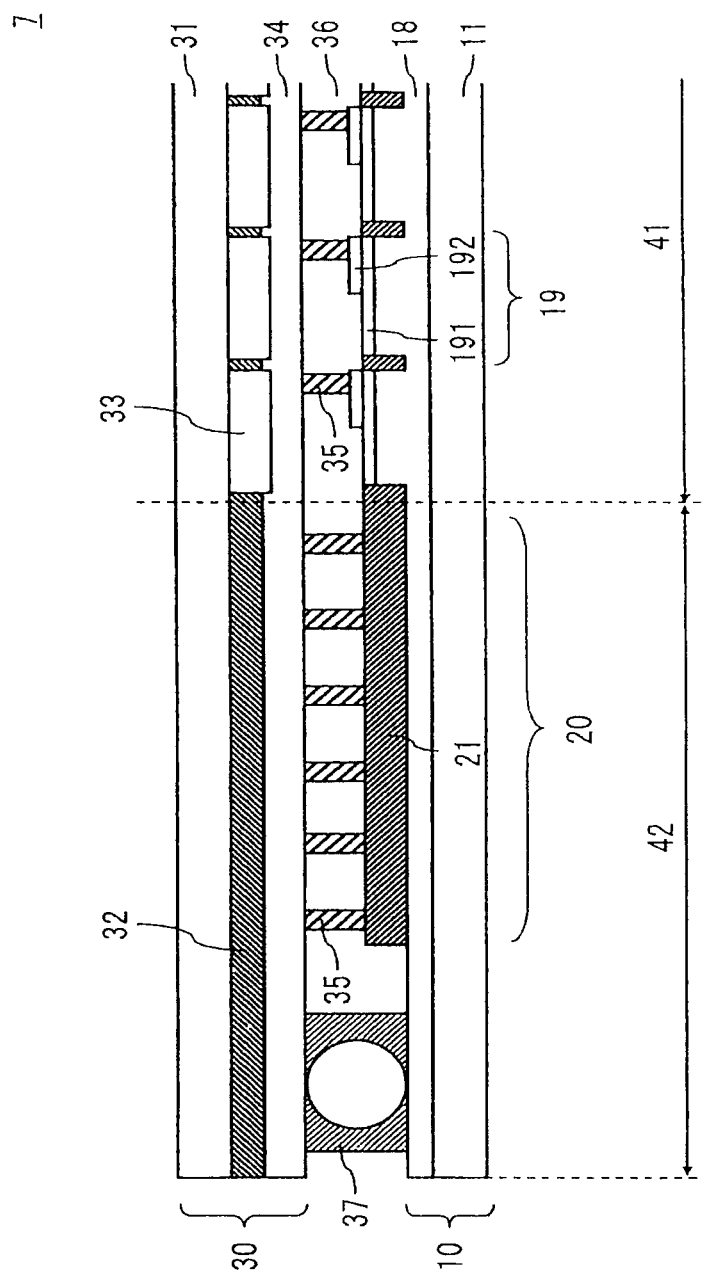
FIG. 14 is a cross sectional view schematically showing the structure at the periphery of the display region and outside thereof of a liquid crystal display panel according to another exemplary example of the fourth embodiment.

Note that the planarizing film 21 is not limited to the above shape. FIG. 14 is a cross sectional view schematically showing the structure at the periphery of the display region 41 and outside thereof of a liquid crystal display panel 7 according to another exemplary example of the fourth embodiment. As shown in FIG. 14, the planarizing film 21 may be formed to fill up the thin film portion of the organic film 18. However, also in this case, as described above, the planarizing film 21 is not provided below the sealing material 37.

As described above, in the fourth embodiment, the planarizing film 21 is further formed on the pixel electrode 19 of the TFT array substrate 10. At this time, the planarizing film 21 is formed so that the height of the surface of the planarizing film 21 provided on the thin film portion of the organic film 18 from the substrate 11 is equal to or larger than the height of the surface of the transmissive pixel electrode 191 from the substrate 11. As such, the height of the surface from the substrate 11 on the reflective pixel electrode 192 is substantially equal to that in the region which is outside the display region 41 and inside the sealing material 37. The columnar spacers 35 keep the distance between the TFT array substrate 10 and the opposing substrate 30 in these parts. Accordingly, the distance between the both substrates outside the display region 41 is equal to that inside the display region 41. Accordingly, the display unevenness that occurs at the periphery of the display region 41 can be suppressed, and the liquid crystal display device having excellent display quality can be provided.

Fifth Embodiment

Figure 15:
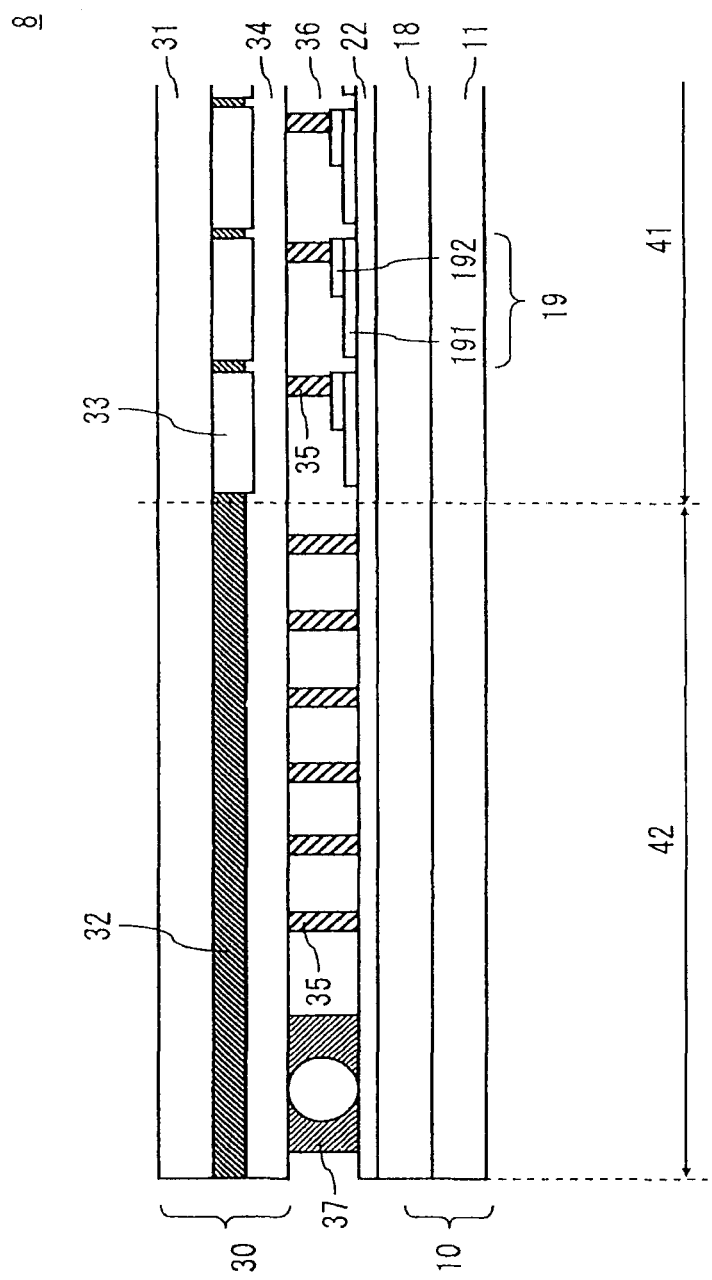
FIG. 15 is a cross sectional view schematically showing the structure at the periphery of a display region and outside thereof of a liquid crystal display panel according to a fifth embodiment.

The liquid crystal display device according to the fifth embodiment will be described with reference to FIG. 15. As the basic structure of the liquid crystal display device according to the fifth embodiment is similar to that of the first embodiment, the overlapping description will be omitted. In the fifth embodiment, the structure of the TFT array substrate 10 is different from that of the first embodiment. FIG. 15 is a cross sectional view schematically showing the structure at the periphery of the display region 41 and outside thereof of a liquid crystal display panel 8 according to the fifth embodiment.

In FIG. 15, the components identical to those in FIG. 5 are denoted by the same reference symbols, and only the difference will be described. As shown in FIG. 15, in the fifth embodiment, an inorganic insulating film 22 is further formed between the organic film 18 and the transmissive pixel electrode 191. Accordingly, in the organic film 18 of the fifth embodiment, the thin film portion is not provided, as is different from the first to fourth embodiments. In summary, as the organic film 18 is covered with the inorganic insulating film 22, the thickness of the organic film 18 is not decreased when the aching is performed on the resist pattern having a difference in film thickness that is formed as a mask to pattern the transmissive pixel electrode 191 and the reflective pixel electrode 192. Accordingly, by providing the inorganic insulating film 22 on the organic film 18, it is possible to prevent the decrease of the film thickness of the organic film 18 in ashing, and to prevent the thin film portion from being formed. The inorganic insulating film 22 may be formed of SiN having a film thickness of 100 nm over the whole surface of the substrate 11 using the CVD device, for example.

The TFT array substrate 10 where the inorganic insulating film 22 is thus provided is bonded to the opposing substrate 30 through the sealing material 37 so that the columnar spacers 35 of the opposing substrate 30 are arranged to be opposed to the reflective pixel electrode 192 and to the region outside the display region 41 and inside the sealing material 37.

As described above, in the fifth embodiment, the inorganic insulating film 22 is further formed between the transmissive pixel electrode 191 and the organic film 18 of the TFT array substrate 10. As such, it is possible to prevent the decrease of the film thickness of the organic film 18 and to prevent the thin film portion from being formed due to the ashing in forming the transmissive pixel electrode 191 and the reflective pixel electrode 192 by one photolithography. In other words, the height of the surface from the substrate 11 in the region outside the display region 41 and inside the sealing material 37 is substantially equal to that on the reflective pixel electrode 192. The columnar spacers 35 keep the gap between the TFT array substrate 10 and the opposing substrate 30 in these parts. Accordingly, the gap between the both substrates outside the display region 41 is equal to that inside the display region 41. Accordingly, it is possible to suppress the display unevenness that occurs at the periphery of the display region 41, and to provide the liquid crystal display device having excellent display quality.

Sixth Embodiment

Figure 16:
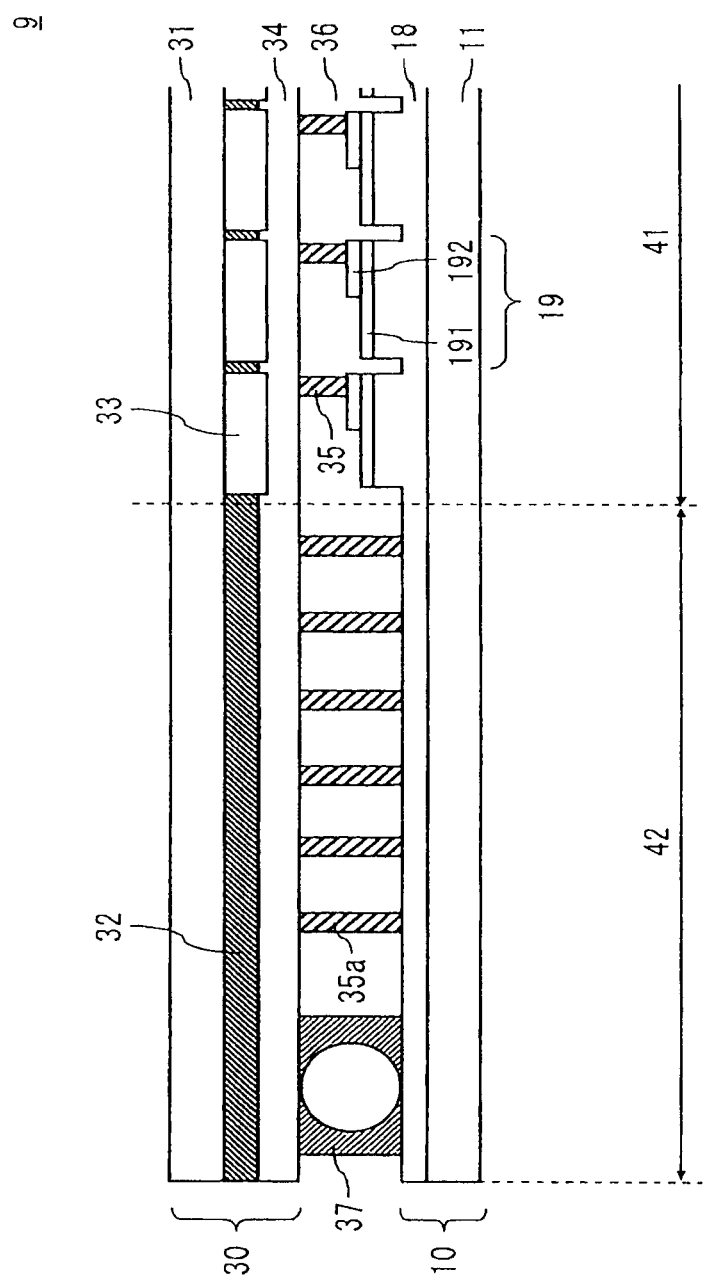
FIG. 16 is a cross sectional view schematically showing the structure at the periphery of a display region and outside thereof of a liquid crystal display panel according to a sixth embodiment.

The liquid crystal display device according to the sixth embodiment will be described with reference to FIG. 16. As the basic structure of the liquid crystal display device according to the sixth embodiment is similar to that of the first embodiment, the overlapping description will be omitted. In the sixth embodiment, the structure outside the display region 41 and inside the sealing material 37 is different from that of the first embodiment. FIG. 16 is a cross sectional view schematically showing the structure at the periphery of the display region 41 and outside thereof of a liquid crystal display panel 9 according to the sixth embodiment.

In FIG. 16, the same components as those in FIG. 5 are denoted by the same reference symbols, and only the difference will be described. As shown in FIG. 16, the gap retaining pad 20 is not provided in the TFT array substrate 10 in a region outside the display region 41 and inside the sealing material 37. Accordingly, the thin film portion of the organic film 18 that is similar to the region between pixels is formed outside the display region 41 of the TFT array substrate 10, as is similar to the related art shown in FIG. 17.

In the sixth embodiment, columnar spacers 35, 35a having different heights are arranged in the opposing substrate 30. The columnar spacer 35a is formed in a region outside the display region 41 and inside the sealing material 37, and has a height larger than that of the columnar spacer 35 that is arranged to be opposed to the reflective pixel electrode 192 in the display region 41. In other words, as the film thickness of the organic film 18 in the outside of the display region 41 is thinner than that of the pixel region, the distance from the surface of the opposing substrate 30 to the surface of the TFT array substrate 10 is larger than that in the pixel region. As such, the columnar spacers 35 and 35a having heights according to each distance are formed so that the both substrates 11 and 31 are arranged to be opposed to each other in parallel across all over the liquid crystal display panel 9. In summary, the columnar spacer 35a is formed to be higher than the columnar spacer 35 according to the difference between the substrate gap outside the display region 41 and the substrate gap in the pixel electrode 19. These columnar spacers 35, 35a may be formed of separate photolithography processes.

The opposing substrate 30 in which the columnar spacers 35, 35a are thus provided is arranged to be opposed to the TFT array substrate 10, and the both substrates are bonded through the sealing material 37.

As stated above, in the sixth embodiment, the columnar spacers 35 and 35a are formed according to each gap so that the columnar spacer 35a that is provided in the region outside the display region 41 and inside the sealing material 37 is higher than the columnar spacer 35 that is arranged to be opposed to the reflective pixel electrode 192 in the display region 41. As such, the both substrates are retained so that the gap between the surface of the TFT array substrate 10 and the surface of the opposing substrate 30 in the region outside the display region 41 and inside the sealing material 37 is wider than that on the reflective pixel electrode 192. In summary, the both substrates are retained by the columnar spacer 35a having larger height so as to cancel the decreased amount of the film thickness of the organic film 18 due to the ashing in forming the transmissive pixel electrode 191 and the reflective pixel electrode 192 by one photolithography. Accordingly, the TFT array substrate 10 and the opposing substrate 30 form the liquid crystal display panel 9 where the substrates are arranged to be opposed to each other in parallel inside and outside the display region 41. Accordingly, the display unevenness that is produced at the periphery of the display region 41 can be suppressed, and the liquid crystal display device having excellent display quality can be provided.

Note that, in the first to sixth embodiments, the description has been made of the liquid crystal display device where the channel etch type TFT 50 is formed. However, another type of TFT 50 such as a top gate type may be provided. Furthermore, although the structure where the upper transparent conductive layer 193 is provided on the reflective pixel electrode 192 for the purpose of preventing sticking has been described as an example, the same effect can be achieved without the upper transparent conductive layer 193 as well. Further, the structure is not limited to the one in which the columnar spacers are provided on the opposing substrate 30. The same effect can be achieved with the structure in which the columnar spacers are provided on the TFT array substrate 10.

The above description has been made of the embodiments of the present invention, and the present invention is not limited to the above embodiments. Further, a person skilled in the art would be able to readily change, add, and modify each element of the above embodiments within the scope of the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device having pixel electrodes, each pixel electrode including a transmissive pixel electrode and a reflective pixel electrode that is formed in a part of the transmissive pixel electrode, the liquid crystal display device comprising:
   an array substrate including the pixel electrodes formed thereon to provide a display region;
   an opposing substrate arranged to be opposed to the array substrate;
   a frame region surrounding the display region, wherein a sealing material is provided in the frame region, the sealing material bonding the array substrate with the opposing substrate;
   an organic film formed on the entirety of the array substrate, the organic film having a uniform thickness with a concave and a convex pattern superposed thereon and provided below the reflective pixel electrode;
   an inorganic insulating film formed on the organic film in at least the frame region and the display region, wherein the inorganic insulating film is provided, in the display region, between the organic film, on the one hand, and the transmissive pixel electrode and reflective pixel electrode, on the other hand; and
   a columnar spacer formed on the opposing substrate between the opposing substrate and the inorganic insulating film, the columnar spacer holding a substrate gap between the array substrate and the opposing substrate in a region outside the display region and inside the sealing material and in the region over the pixel electrodes.

2. A liquid crystal display device having pixel electrodes, each pixel electrode including a transmissive pixel electrode and a reflective pixel electrode that is formed in a part of the transmissive pixel electrode, the liquid crystal display device comprising:
   an array substrate including the pixel electrodes formed thereon to provide a display region;
   an opposing substrate arranged to be opposed to the array substrate;
   a frame region surrounding the display region, wherein a sealing material is provided in the frame region, the sealing material bonding the array substrate with the opposing substrate;
   an organic film formed on the array substrate, the organic film having a thick film portion provided below the pixel electrodes, a uniformly thin film portion that is provided in the frame region, and a thin film portion that is provided between the pixel electrodes in the display region;
   a columnar spacer formed on the opposing substrate, the columnar spacer holding a substrate gap between the array substrate and the opposing substrate, wherein
   the columnar spacer includes a first columnar spacer formed in a position opposed to the pixel electrodes and a second columnar spacer formed in a region outside the display region and inside the sealing material, and
   the second columnar spacer is formed to be higher than the first columnar spacer according to a difference between the substrate gap outside the display region and the substrate gap over the pixel electrode.

* * * * *